US009339725B2

(12) United States Patent
Ohta et al.

(10) Patent No.: US 9,339,725 B2
(45) Date of Patent: May 17, 2016

(54) GAME PROGRAM AND GAME APPARATUS

(75) Inventors: Keizo Ohta, Kyoto (JP); Kenta Sato, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 2104 days.

(21) Appl. No.: 11/295,468

(22) Filed: Dec. 7, 2005

(65) Prior Publication Data

US 2006/0178213 A1    Aug. 10, 2006

(30) Foreign Application Priority Data

Jan. 26, 2005    (JP) ................................ 2005-017982

(51) Int. Cl.
*A63F 9/00*    (2006.01)
*A63F 13/40*    (2014.01)

(52) U.S. Cl.
CPC ......... *A63F 13/10* (2013.01); *A63F 2300/1075* (2013.01); *A63F 2300/1081* (2013.01); *A63F 2300/301* (2013.01); *A63F 2300/6045* (2013.01); *A63F 2300/6072* (2013.01); *A63F 2300/64* (2013.01); *A63F 2300/8011* (2013.01); *A63F 2300/8094* (2013.01)

(58) Field of Classification Search
USPC ................................................... 463/37, 43
See application file for complete search history.

(56) References Cited

U.S. PATENT DOCUMENTS

| | | | | |
|---|---|---|---|---|
| 6,064,964 | A * | 5/2000 | Yamamoto et al. | 704/270 |
| 6,529,875 | B1 * | 3/2003 | Nakajima et al. | 704/275 |
| 2004/0090431 | A1 * | 5/2004 | Kong et al. | 345/173 |
| 2005/0159223 | A1 * | 7/2005 | Tahara et al. | 463/43 |

FOREIGN PATENT DOCUMENTS

| | | |
|---|---|---|
| EP | 0 850 673 | 7/1998 |
| EP | 1498163 | 1/2005 |
| JP | 11-143484 | 5/1999 |
| JP | 2001-276416 | 10/2001 |

OTHER PUBLICATIONS

Berger, *FooBillard a billiard game in which a match-up on a network can be enjoyed*, Nikkei Linux, published by Nikkei Business Publication Inc., Aug. 8, 2003, vol. 5, No. 8, pp. 101-104 along with a Plat'Home advertisement for Plat'Works, Trus-E Series, cover page of publication, and translation of Table 1. Main Operations in Foobillard.

Transcript of the Patent Decision and a translated version of claims (claims 1 and 9) patented in Japan (Japanese Patent Application No. 2005-017982).

* cited by examiner

*Primary Examiner* — Seng H Lim
(74) *Attorney, Agent, or Firm* — Nixon & Vanderhye P.C.

(57) ABSTRACT

When an operator blows a breath of a strength S on a microphone 34, for example, clouds C move in directions of vectors (A) at an initial velocity (constant L×breathing strength S/magnitude of vector A1). The vector A1 is a vector spanning from a reference point 105 to a center of the cloud C1. For example, even when the operator blows a breath of the same strength, the clouds C do not move in the same direction at the same velocity but a moving velocity and a moving direction of each cloud C vary depending on each position of the clouds C. Therefore, amusement of a game can be enhanced.

24 Claims, 19 Drawing Sheets

F I G. 4
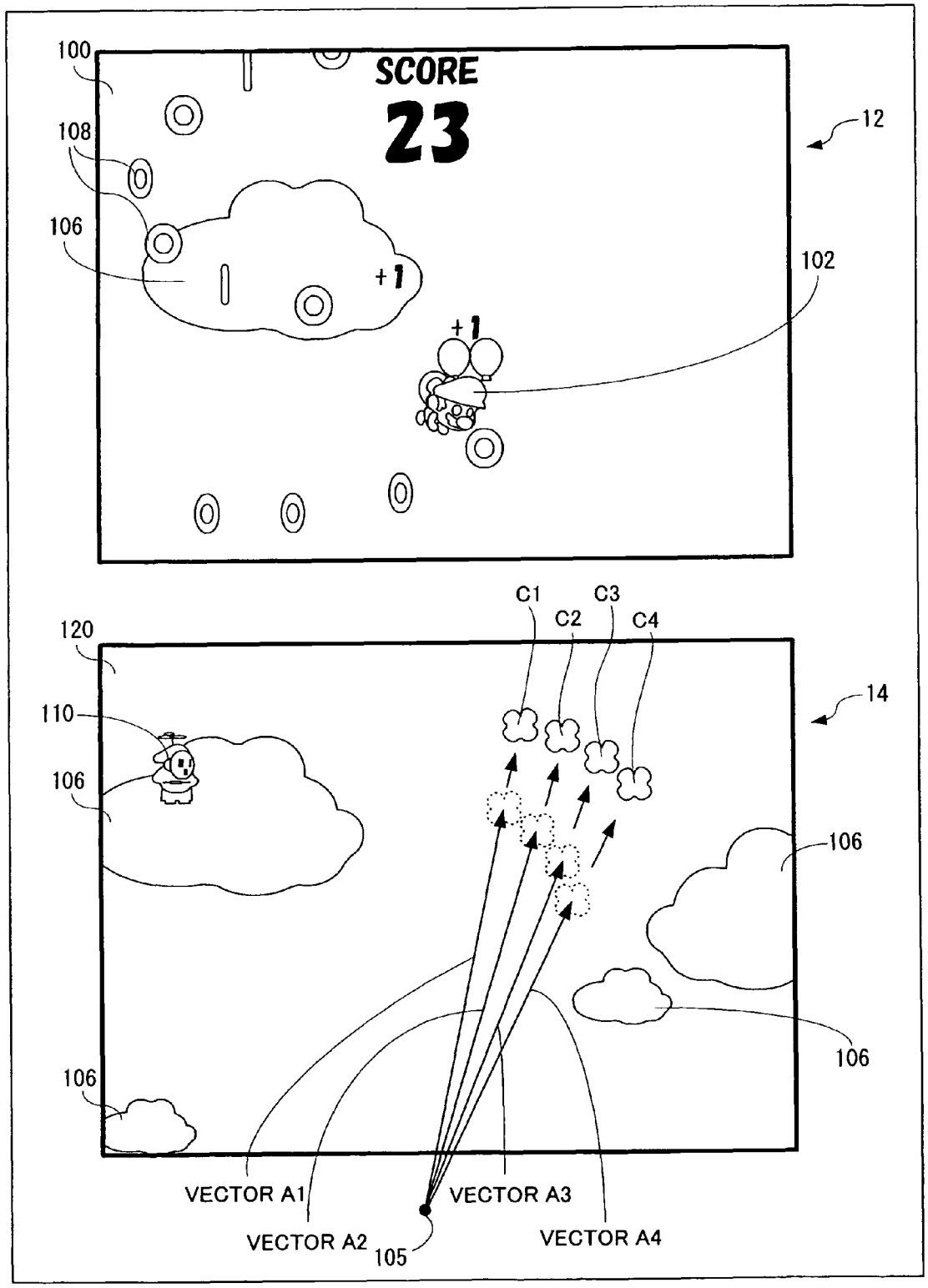

F I G. 7
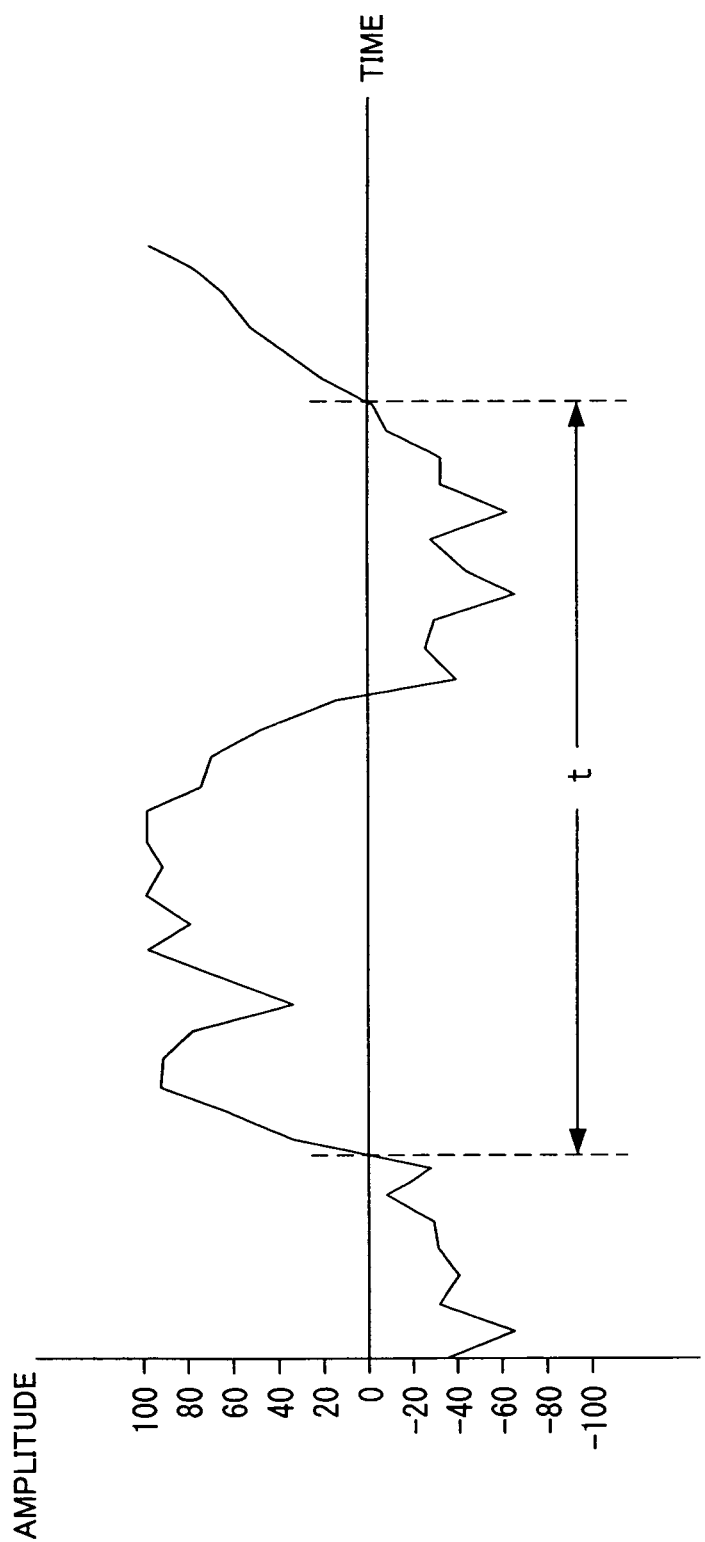

| AREA | f | DISTRIBUTION OF INTERVALS t | | | |
|---|---|---|---|---|---|
| | | GROUP A (t=2~25) | GROUP B (t=26~50) | GROUP C (t=51~75) | GROUP D (t= equal to or more than 76) |
| 1 | 100~199 | $1 < x_A < 15$ | $1 < x_B < 13$ | $0 \leq x_C < 9$ | $0 \leq x_D < 6$ |
| 2 | 200~299 | $2 < x_A < 40$ | $1 < x_B < 19$ | $0 \leq x_C < 9$ | $0 \leq x_D < 6$ |
| 3 | 300~399 | $2 < x_A < 50$ | $1 < x_B < 19$ | $0 \leq x_C < 8$ | $0 \leq x_D < 6$ |
| 4 | 400~499 | $10 < x_A < 90$ | $1 < x_B < 19$ | $0 \leq x_C < 8$ | $0 \leq x_D < 6$ |
| 5 | 500~599 | $40 < x_A < 100$ | $1 < x_B < 15$ | $0 \leq x_C < 5$ | $0 \leq x_D < 2$ |
| 6 | 600~699 | $65 < x_A < 110$ | $1 < x_B < 15$ | $0 \leq x_C < 2$ | $0 \leq x_D < 2$ |
| 7 | 700~799 | $65 < x_A < 130$ | $1 < x_B < 10$ | $0 \leq x_C < 2$ | $x_D = 0$ |
| 8 | 800~899 | $75 < x_A < 150$ | $0 \leq x_B < 8$ | $0 \leq x_C < 2$ | $x_D = 0$ |
| 9 | 900~1099 | $90 < x_A < 199$ | $0 \leq x_B < 3$ | $x_C = 0$ | $x_D = 0$ |
| 10 | 1100~1299 | $120 < x_A < 199$ | $0 \leq x_B < 3$ | $x_C = 0$ | $x_D = 0$ |
| 11 | 1300~1499 | $150 < x_A < 199$ | $0 \leq x_B < 3$ | $x_C = 0$ | $x_D = 0$ |
| 12 | 1500~1883 | $x_A > 199$ | $x_B = 0$ | $x_C = 0$ | $x_D = 0$ |
| 13 | EQUAL TO OR MORE THAN 1884 | $x_A > 200$ | | | |

F I G. 1 2
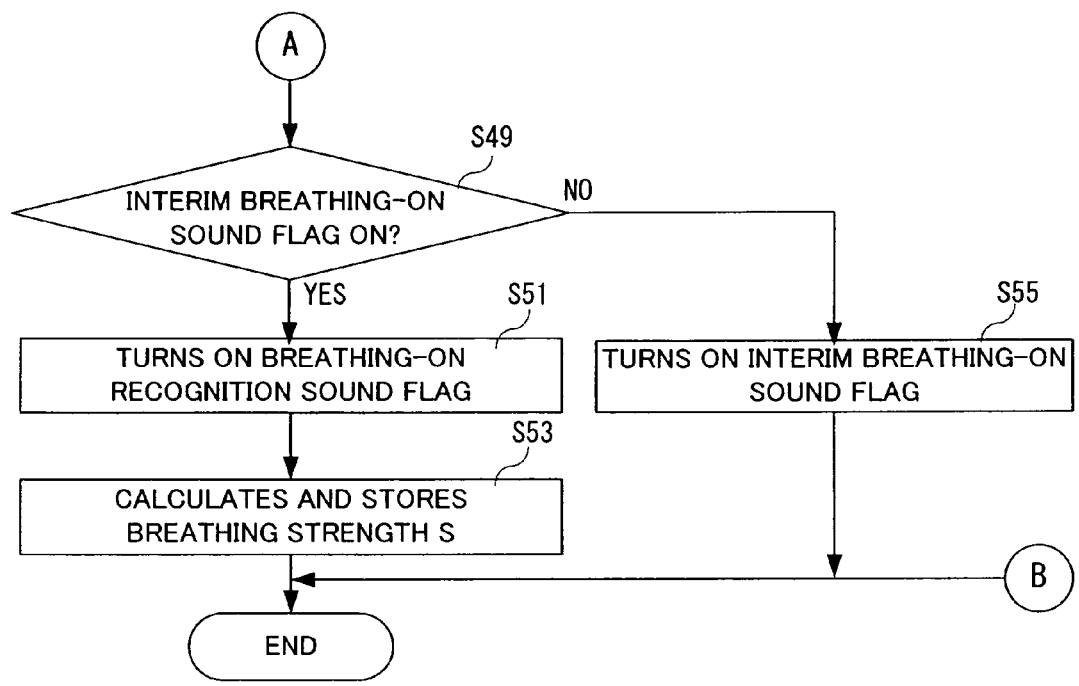

F I G. 1 5
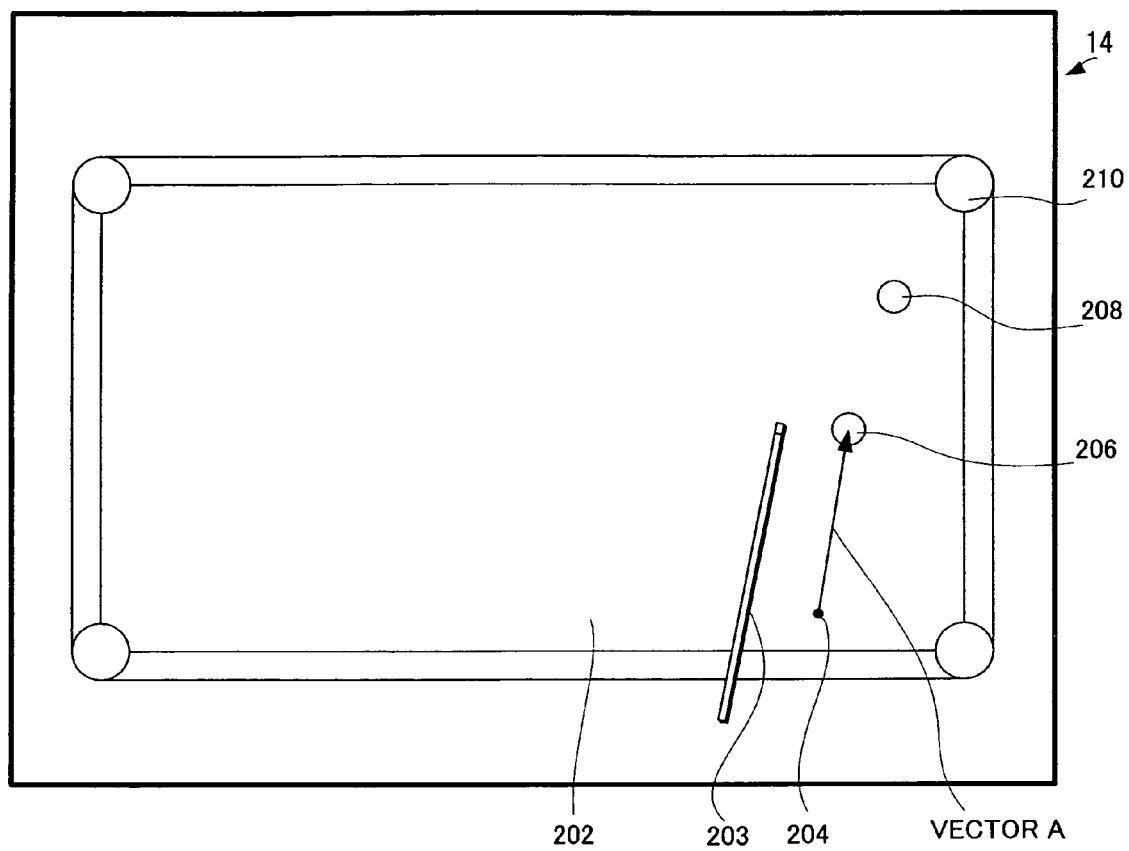

F I G. 1 7
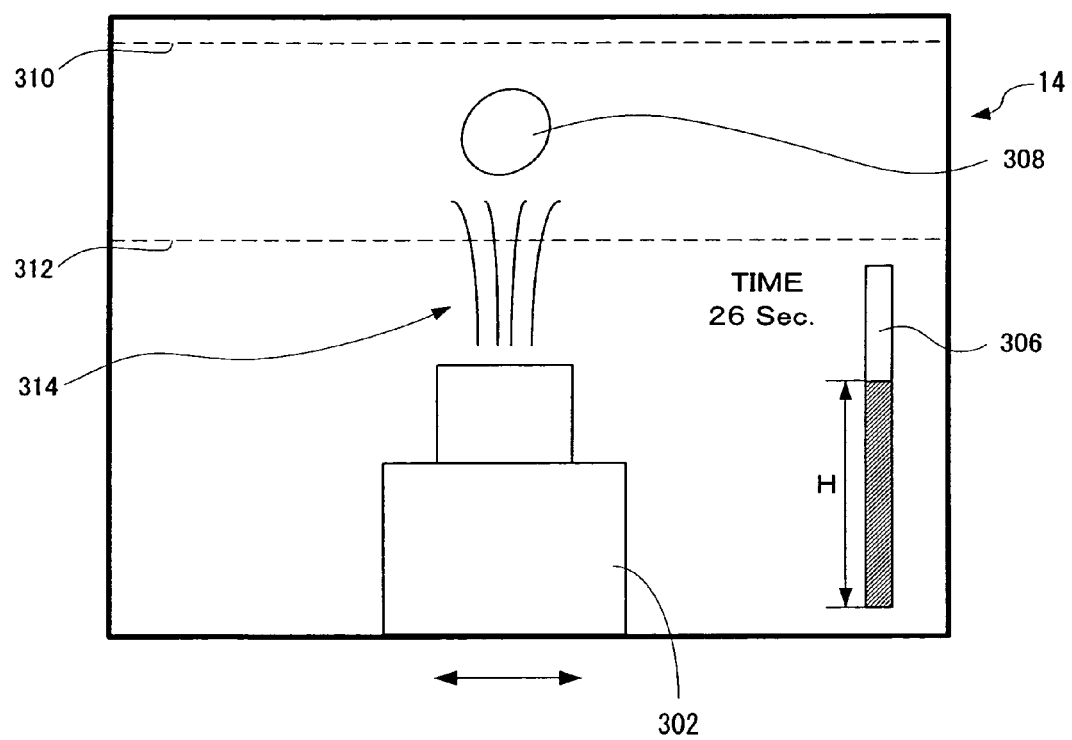

GAME PROGRAM AND GAME APPARATUS

CROSS REFERENCE OF RELATED APPLICATION

The disclosure of Japanese Patent Application No. 2005-017982 is incorporated herein by reference.

BACKGROUND OF THE INVENTION

1. Field of the Invention

The present invention relates to a technique for executing a game process by using information inputted via a microphone.

2. Description of the Background Art

In Japanese Laid-Open Patent Publication No. 11-143484, it is disclosed that sound power (breathing strength) of breathing-on is converted to a moving velocity or the like of a balloon or the like on a display screen (refer to [0032] in the Japanese Laid-Open Patent Publication).

In the field of games, however, there have been cases where calculating the above-mentioned moving velocity or the like by referring only to property data of a sound inputted via a microphone fails to make a game amusing.

SUMMARY OF THE INVENTION

Therefore, an object of the present invention is to enhance amusement of a game.

In one embodiment of the present invention, a control amount of an object existing in a game space is calculated by referring to not only sound property data (a first input variable) inputted via a microphone but also a second input variable which is different from the sound property data and determined by a user's input operation.

According to this embodiment, the above-mentioned control amount can be more accurately determined, as compared to the case where only the sound property data is referred to. Therefore according to the present embodiment, game amusement can be enhanced.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a diagram (2) illustrating an example of a game screen image in the first example;

FIG. 7 is a graph showing an expanded part of the waveform shown in FIG. 6;

FIG. 8 is a table showing specific reference data used for a breathing-on determination process;

FIG. 12 is a flowchart showing another part of the breathing-on determination process, which follows the breathing-on process shown in FIG. 11;

FIG. 15 is a diagram illustrating an example of a game screen image in a second example;

FIG. 17 is a diagram illustrating an example of a game screen image in a third example;

DESCRIPTION OF THE PREFERRED EMBODIMENT

First Example

Figure 1:
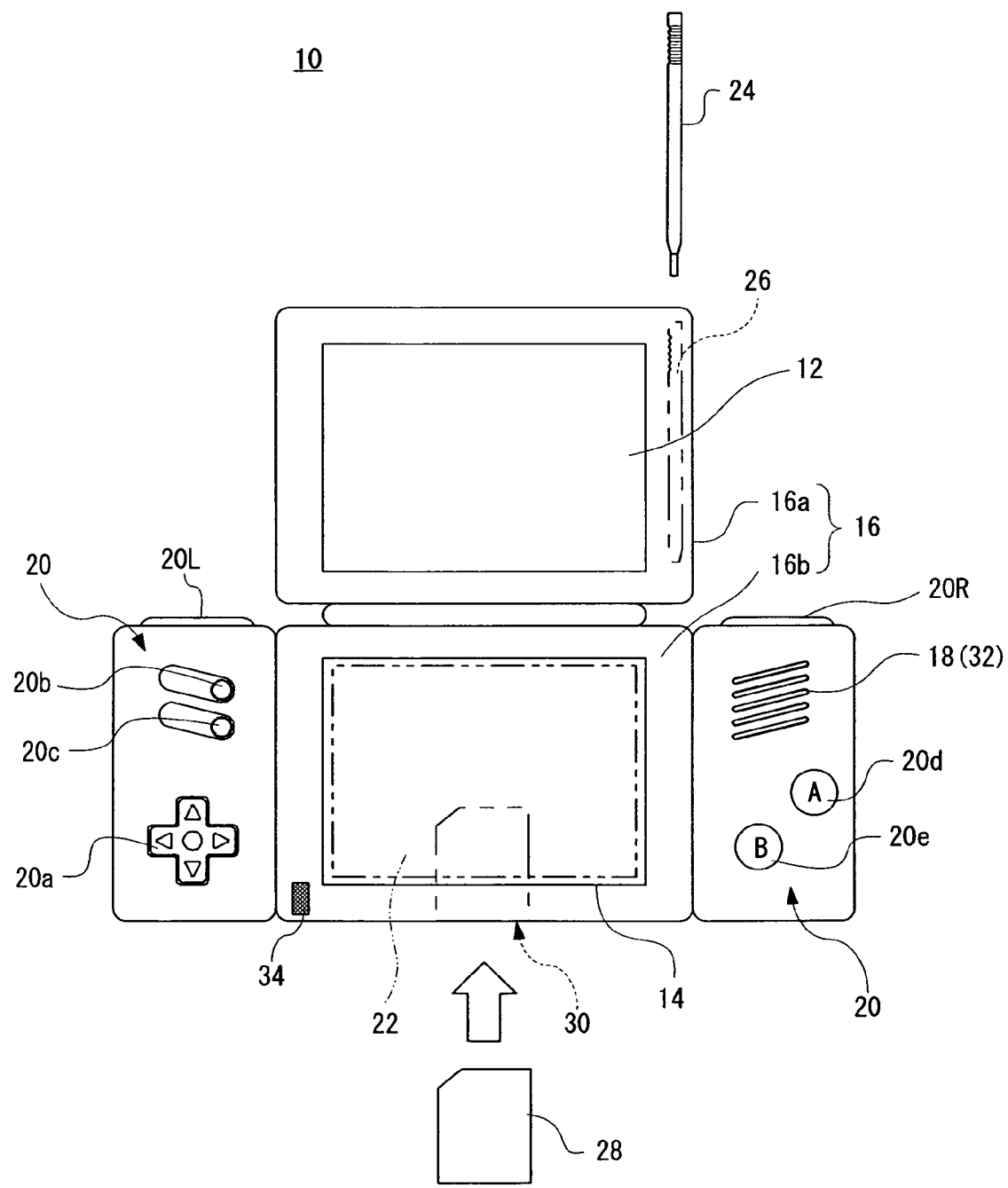
FIG. 1 is a diagram illustrating an example of a game apparatus of the present invention.

In FIG. 1, a game apparatus 10 according to a first example of the present invention includes a first liquid crystal display (LCD) 12 and a second LCD 14 which are accommodated in a housing 16 so as to be placed in predetermined positions. For example, the housing 16 is composed of an upper housing 16a and a lower housing 16b, the LCD 12 being accommodated in the upper housing 16a and the LCD 14 being accommodated in the lower housing 16b. Therefore the LCD 12 and the LCD 14 are disposed in vicinity of each other so as to be arranged vertically (on top of the other).

In the first example, although the LCDs are used as display devices, the LCDs may be substituted with an EL (Electronic Luminescence) display and a plasma display.

In addition, the game apparatus 10, as described hereinafter, has stored a breathing-on determination program (see 480f in FIG. 9, FIG. 11, and FIG. 12) and also functions as a breathing-on determination device.

As shown in FIG. 1, the upper housing 16a has a planar contour which is slightly larger than that of the LCD 12 and has an opening in one principal face thereof, through which a display screen of the LCD 12 is exposed. The lower housing 16b has a more elongated planar contour than that of the upper housing 16a (i.e., so as to have a longer lateral dimension) and an opening for exposing a display screen of the LCD 14 is formed in a portion of the lower housing 16b, which lies substantially in the center of the lower housing 16b along the lateral direction. A sound hole 18 is formed in the lower housing 16b and operation switches 20 (20a, 20b, 20c, 20d, 20e, 20L, and 20R) are provided.

The upper housing 16a and the lower housing 16b are disposed such that the lower side (lower edge) of the upper housing 16a and the upper side (upper edge) of the lower housing 16b are coupled so as to be pivotable. Therefore, for example, when a game is not played, damage such as scratches on faces of the display screens of the LCD 12 and the LCD 14 can be prevented by pivoting the upper housing 16a and folding the housing 16 such that the faces of the LCD 12 and the LCD 14 mutually face. However, a housing 16 may be formed such that the upper housing 16a and the lower housing 16b are mounted in an integral (fixed) manner, not in a coupled manner so as to be pivotable.

The operation switches 20 include: a direction instruction switch (cross key) 20a; a start switch 20b, a select switch 20c; an operation switch ("A" button) 20d; an operation switch ("B" button) 20e; an operation switch ("L" button) 20L; and an operation switch ("R" button) 20R. The switches 20a, 20b, and 20c are disposed on a principal face of a left wing of the lower housing 16b (lying to the left of the LCD 14). The switches 20d and 20e are disposed on a principal face of a right wing of the lower housing 16b (lying to the right of the LCD 14). The switches 20L and 20R are respectively parts of an upper edge (rear side face) of the lower housing 16b and disposed at the left and right so as to sandwich a coupling section for the upper housing 16a, but not at the coupling section.

The direction instruction switch 20a functions as a digital joystick and is used for providing instructions, by operating one of four pressing sections, concerning a moving direction of a player character (or a player object) which can be controlled by an operator (a player), instructions concerning a moving direction for a cursor, or the like. The start switch 20b is composed of a push button and used for starting (resuming) a game, making a pause or the like. The select switch 20c is composed of a push button and used for selecting a game mode or the like.

The operation switch 20d, i.e., the "A" button, is composed of a push button and used for giving instructions other than the direction instructions, causing the player character to perform arbitrary actions such as "beat" ("punch"), "throw", "grasp" ("pick up"), "ride", "jump" or the like. For example, in the case of an action game, instructions such as "jump", "punch", "use a weapon", etc., can be given. And in the case of a role playing game (PRG) or a simulation PRG, instructions such as "get an item", "select a weapon", "select a command", "determine a weapon", "determine a command", etc., can be given. The operation switch 20e, i.e., the "B" button, comprises a push button and used for changing a game mode selected by the select switch 20c, canceling an action determined by the "A" button 20d, etc.

The operation switch (L button) 20L and the operation switch (R button) 20R are composed of push buttons and can be used for operations similar to those by the "A" button 20d and "B" button 20e and for operations auxiliary to the "A" button 20d and "B" button 20e.

A touch panel 22 is mounted on the upper principal face of the LCD 14. The touch panel may be of any one, for example, of a resistive film type, an optical type (infrared type), or a capacitive coupling type. When a stick 24, a pen (stylus pen) or a finger (hereinafter these may be referred to as "stick 24 or the like") is pressed against or dragged on or touched on the upper principal face of the touch panel 22, the stick 24 or the like detects the coordinates (touch coordinates) of the operated (touch-inputted) position of the stick 24 or the like and outputs coordinate data corresponding to the detected touch coordinates.

For example, the display screen of the LCD 14 (also or substantially also that of the LCD 12) has a resolution of 256 dots×192 dots and the detection face of the touch panel 22 also has a detection accuracy of 256 dots×192 dots so as to correspond to the resolution. The detection accuracy of the touch panel 22 may be lower or higher than the resolution of the display screen of the LCD 14.

On the LCD 12 and the LCD 14, different game images (game screen pictures) can be displayed. For example, in a race game, a screen picture projected from a viewpoint in a cockpit can be displayed on one of the LCDs and a screen picture of a whole race (course) can be displayed on the other. And in a RPG, a map or a character such as a player character can be displayed on the one LCD and an item which the player character has can be displayed on the other LCD. Further in a puzzle game, a whole puzzle (game map) can be displayed on the one LCD (for example, the LCD 12) and a part of the game map (a screen picture for operating the puzzle game) can be displayed on the other LCD (for example, the LCD 14). For example, on the screen picture showing the part of the game map, images such as letters and figures can be written and a display image (icon) or the like can be moved. Furthermore, by combining the two LCD 12 and LCD 14 and using them as one screen, a giant monster (enemy character) which the player character must defeat can be displayed.

Accordingly, by operating the touch panel 22 by means of the stick 24 or the like, a player can specify (designate) and move a player character, an enemy character, an item character, textual information, a character image such as an icon, etc., select a command, and further write letters and figures (pictures). And also a direction of a virtual camera (viewpoint) provided in a 3-dimentional game space can be changed and a game screen image (game map) can be scrolled (gradually shift-displayed).

Thus the game apparatus 10 has the LCD 12 and the LCD 14 as display sections of two screens, with the touch panel 22 mounted on either one of the LCDs (the LCD 14 in the first example), resulting in a configuration having two screens (12 and 14) and two operation sections (20 and 22).

In the first example, the stick 24 can be accommodated in an accommodation section 26 (accommodation hole) provided near a side face (right side face) of the upper housing 16a and as necessary, is taken out. However, if the stick 24 is not provided, it is not necessary to provide the accommodation section 26.

The game apparatus 10 further includes a memory card (or a game cartridge) 28 which is detachably inserted into an insertion slot 30 provided on a front side face of the lower housing 16b. Though not shown in FIG. 1, in a depth end of the insertion slot 30 is provided a connector 46 (see FIG. 2) for connecting with a connector (not shown) provided at an end portion of the memory card 28 and therefore when the memory card 28 is inserted into the insertion slot 30, the connectors are mutually connected, causing a CPU core 42 (see FIG. 2) of the game apparatus 10 to access the memory card 28.

The game apparatus 10 further includes a microphone 34 which is provided, for example, outside and around a lower left corner of the LCD 14, of the lower housing 16b. Therefore, for example, when a player's voice (particularly a breathing sound) is inputted via the microphone 34, the game apparatus 10 can accordingly execute a game process.

Though not shown in FIG. 1, a loudspeaker 32 (see FIG. 2) is provided, at a position corresponding to the sound hole 18, in an inside of the lower housing 16b.

And though not shown in FIG. 1, for example, in the back face of the lower housing 16b is provided a battery accommodation box and on the front side face of the lower housing 16b is provided a power switch, a volume switch, an external extension connector, an earphone jack, etc.

Figure 2:
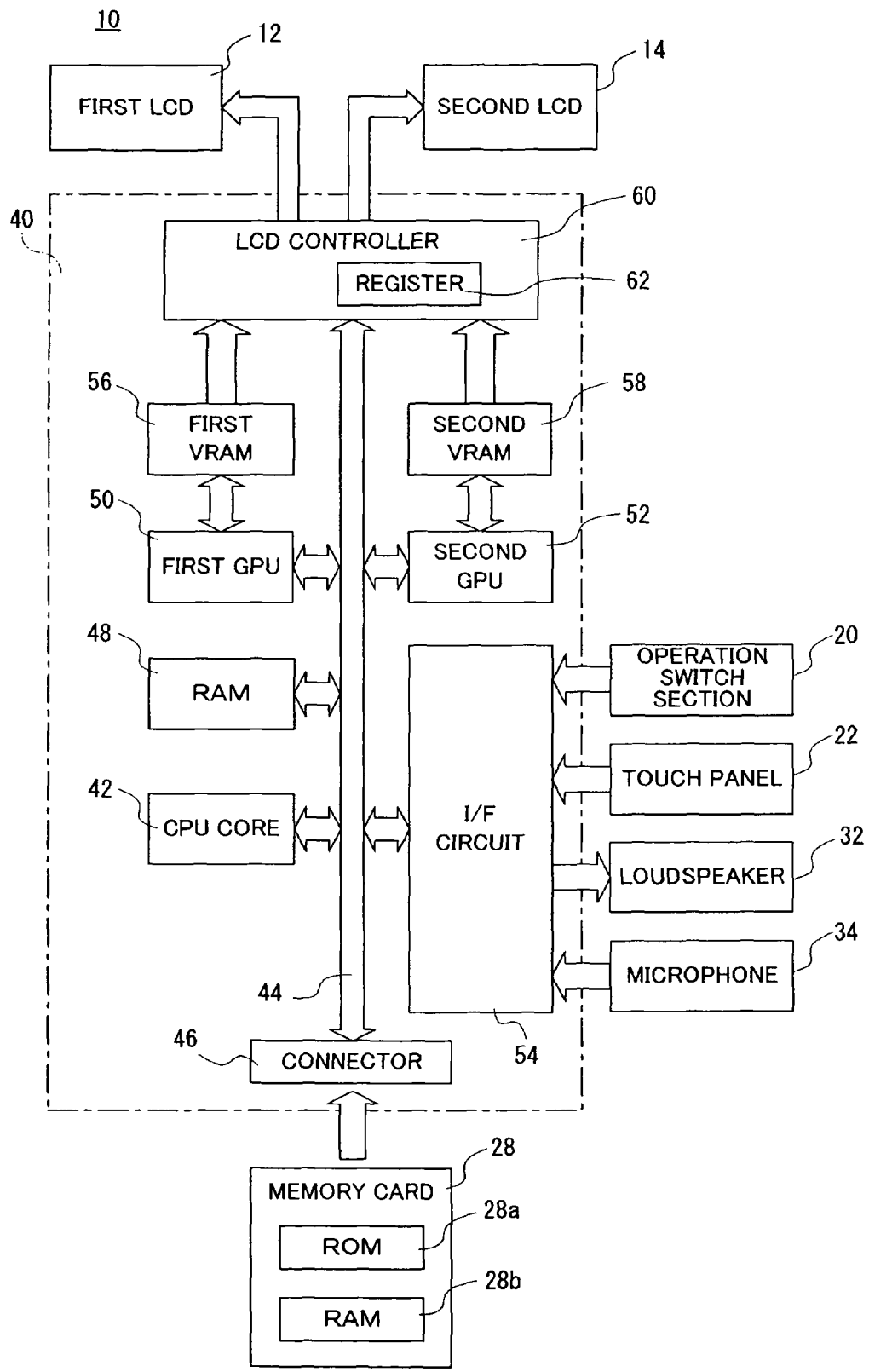
FIG. 2 is a block diagram illustrating an electrical structure of the game apparatus shown in FIG. 1.

FIG. 2 is a block diagram illustrating an electrical structure of the game apparatus 10. In FIG. 2, the game apparatus 10 includes an electronic circuit board 40 on which a circuitry component such as the CPU core (processing means) 42 is mounted. Via a bus 44, the CPU core 42 is connected to a connector 46, RAM (storage means) 48, a first graphic processing unit (GPU) 50, a second GPU 52, an input/output interface circuit (hereinafter, referred to as "I/F circuit") 54, and an LCD controller 60.

As described above, the memory card 28 is detachably connected to the connector 46. The memory card 28 includes a ROM 28a and RAM 28b which are, though not shown, mutually connected via a bus and further connected to a connector (not shown) for connecting with the connector 46. As described above, the CPU core 42 thereby can access the ROM 28a and RAM 28b.

The ROM 28a has previously stored thereon a game (virtual game) program which is to be executed on the game apparatus 10; image (a character image, a background image, an item image, icon (button) image, a message image, etc.) data; sound (music) data (audio data) required for the game; or the like. The RAM (backup RAM) 28b stores (saves) temporary data and resulting data of the game.

The RAM 48 is used as a buffer memory or a working memory. In other words, the CPU core 42 loads to the RAM 48 the game program stored in the ROM 28a of the memory card 28, the image data, the sound data or the like and executes the loaded game program. And the CPU core 42 executes a game process while storing, to the RAM 48, data (game data and flag data) temporarily generated in accordance with game proceeding.

The game program, the image data, and the sound data are entirely or partially and sequentially read from the ROM 28a and stored (loaded) in the RAM 48.

The GPUs 50 and 52 form parts of a writing means, respectively, are composed of, for example, single chip ASICs, accept graphics commands (instructions to draw) from the CPU core 42, and generate game image data according to the graphics commands. In addition to the graphics commands, the CPU core 42 gives the GPUs 50 and 52, respectively, image generation programs (included in the game program) required for generating the game image data.

The GPU 50 is connected to a first video RAM (hereinafter, referred to as "VRAM") 56 and the GPU 52 is connected to a second VRAM 58. The GPUs 50 and 52 obtain data (image data: data of characters, texture, etc.) required for executing the graphics commands, by accessing the first VRAM 56 and the second VRAM 58. The CPU core 42 writes the image data required for writing, via the GPUs 50 and 52, to the first VRAM 56 and the second VRAM 58. The GPU 52 creates the game image data for writing by accessing the VRAM 56 and the GPU 52 creates the game image data for writing by accessing the VRAM 58.

The VRAM 56 and the VRAM 58 are connected to the LCD controller 60. The LCD controller 60 includes a register 62 which is, for example, composed of 1 bit and stores a value (data value) of "0" or "1" in accordance with an instruction from the CPU core 42. When the data value in the register 62 is "0", the LCD controller 60 outputs to the LCD 12 the game image data created by the GPU 50 and to the LCD 14 the game image data created by GPU 52. And when the data value in the register 60 is "1", the LCD controller 60 outputs to the LCD 14 the game image data created by the GPU 50 and to the LCD 12 the game image data created by the GPU 52.

The LCD controller 60 reads the game image data directly from the VRAM 56 and the VRAM 58, and reads the game image data, via the GPUs 50 and 52, from the VRAM 56 and the VRAM 58.

The I/F circuit 54 is connected to the operation switches 20, the touch panel 22, the loudspeaker 32, and the microphone 34. Here, the operation switches 20 include the switches 20a, 20b, 20c, 20d, 20e, 20L and 20R, which are described above, and when the operation switches 20 are operated, a corresponding operation signal is converted to digital data (operation data) in the I/F circuit 54, which is inputted to the CPU core 42. Coordinate data from the touch panel 22 is inputted to the CPU core 42 via the I/F circuit 54. Further the CPU core 42 reads from the RAM 48 the sound data, required for a game, such as game music (BGM), sound effect, voice of a game character (echoic sound), which is inputted to the I/F circuit 54. The I/F circuit 54 converts the sound data to an analog audio signal, which is outputted from the loudspeaker 32. And further the sound (audio signal) inputted via the microphone 34 is converted to digital data (sound data) in the I/F circuit 54, which is inputted to the CPU core 42.

Figure 3:
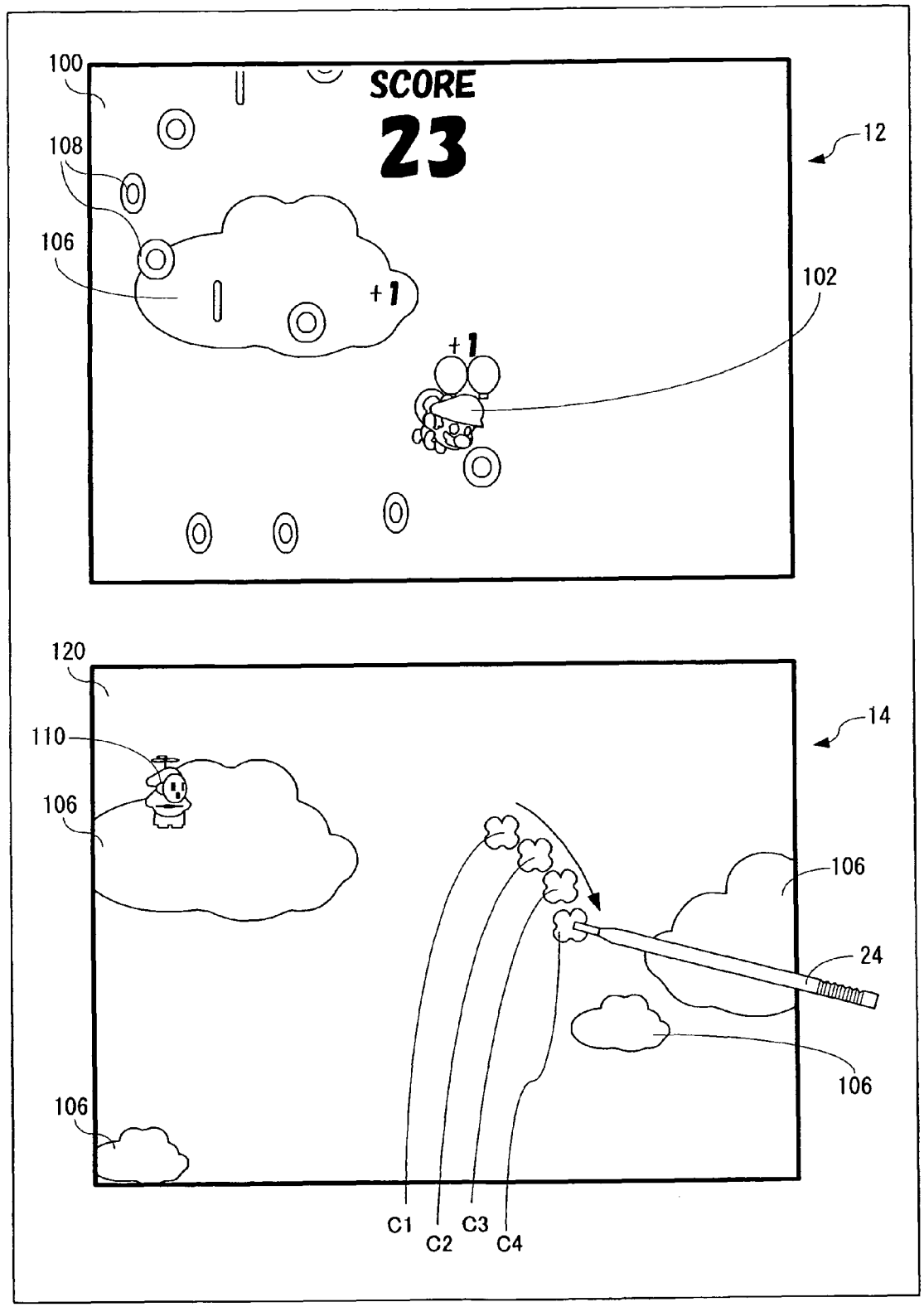
FIG. 3 is diagram (1) illustrating examples of game screen images in a first example.

Specific description will be given by exemplifying game screen images. FIG. 3 is a diagram illustrating examples of the game screen images. As shown in FIG. 3, a game screen image 100 is displayed on the LCD 12 and a game screen image 120 is displayed on the LCD 14. In the present example, however, because the LCD 12 and the LCD 14 are combined and used as one screen (display device), one 3-dimentional virtual space (game space) of the game image 100 and the game screen image 120 is displayed. In the game screen image 100 and the game screen image 120, the game space like a sky is displayed. In the game screen image 100, a player character 102 is displayed at a position below the center, a plurality of clouds C (C1, C2, C3, and C4 in detail) and a cloud 106 as background objects are displayed, and a plurality of coins 108 as predetermined items are displayed. At an upper central position, points (score) which the player character 102 earns by obtaining the coins 108 are displayed. Though not shown in the figure, other background objects and enemy characters are also displayed. Whereas the clouds C are displayed in accordance with the player's touch input, the cloud 106 is previously displayed as the background object.

In the game screen image 120, a plurality of the clouds C and clouds 106 are displayed and a plurality of coins are displayed. Also in the game screen image 120, an enemy character 110 is displayed on the cloud 106 which is displayed at a left upper position. Though not shown in the figure, in the game screen image 120, other background object(s) and other enemy character(s) are also displayed.

Figure 5:
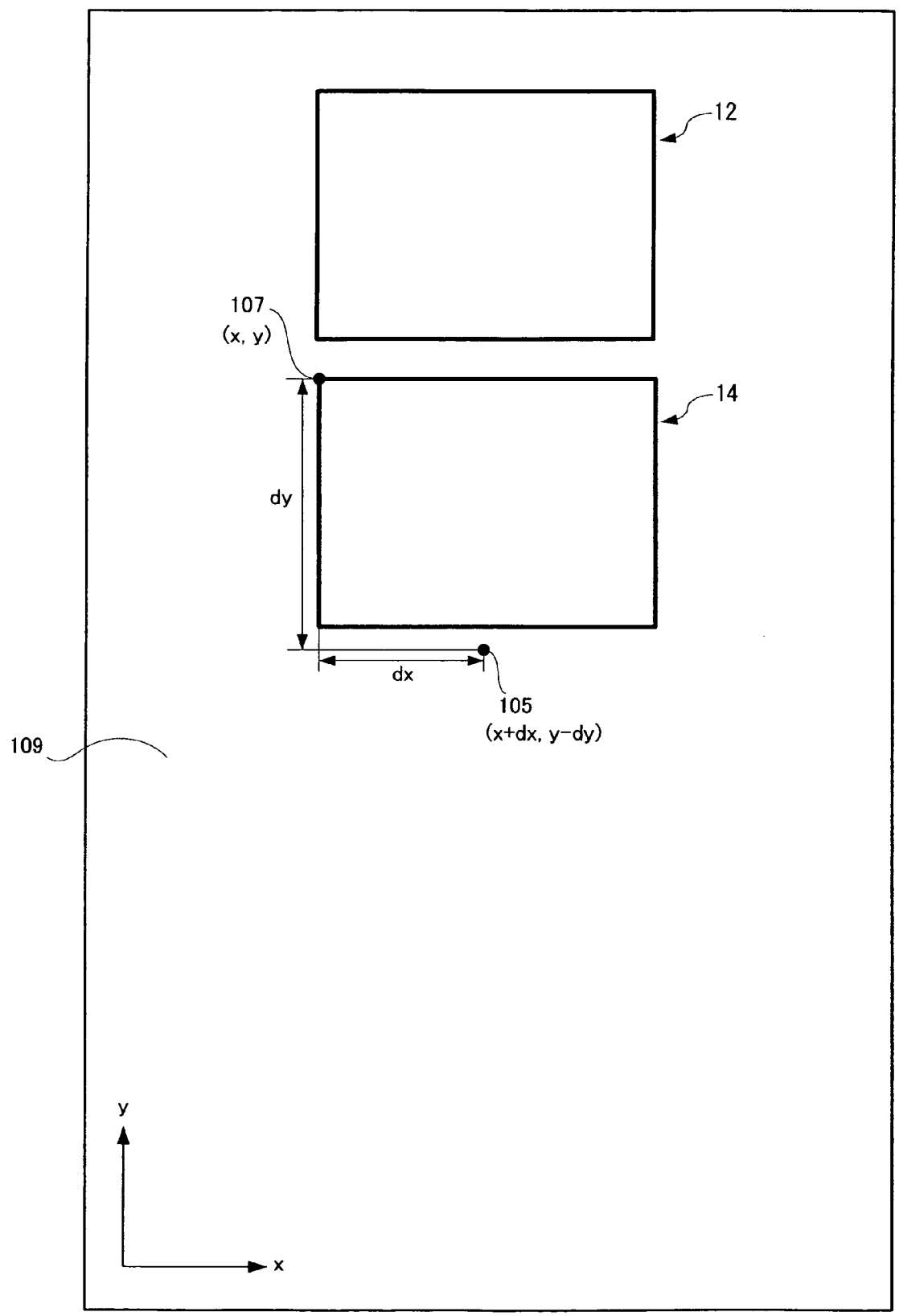
FIG. 5 is a diagram showing a relationship among a map, two LCDs, and a reference point.

The game screen images 100 and 120 show parts of a map 109 as shown in FIG. 5. In other words, displayed areas of a virtual game space on the map 109 are shown on the LCD 12 and the LCD 14. By conceptually displaying the positions of the LCD 12 and the LCD 14 so as to seemingly move downward on the fixed map 109, the player character 102 is represented as if the player character 102 in the air were descending toward the ground. Conversely, it can be also said that the map 109 is displayed as if the map 109 were moving upward and downward on the fixed LCD 12 and LCD 14.

In the present example, the player character 102 moves downward regardless of a player's instruction. During the game, the player, for example, presses down on the LCD 14 (touch panel 22) by means of the stick 24 or the like, thereby making it possible to display clouds 104 on the LCD 14 and to move the player character 102 left and right so as to glide on the clouds C. The clouds C are displayed at positions (coordinate positions) corresponding to coordinates (detected coordinates) indicated by coordinate data, inputted from the touch panel 22, which are detected per predetermined time (1 frame: unit time of updating a screen). The player can draw the clouds C by means of the stick 24 or the like such that the player character 102 can obtain the coins 108. As shown in FIG. 3, 1 (+1) is added to the score each time the player character 102 obtains the coin 108.

Figure 10:
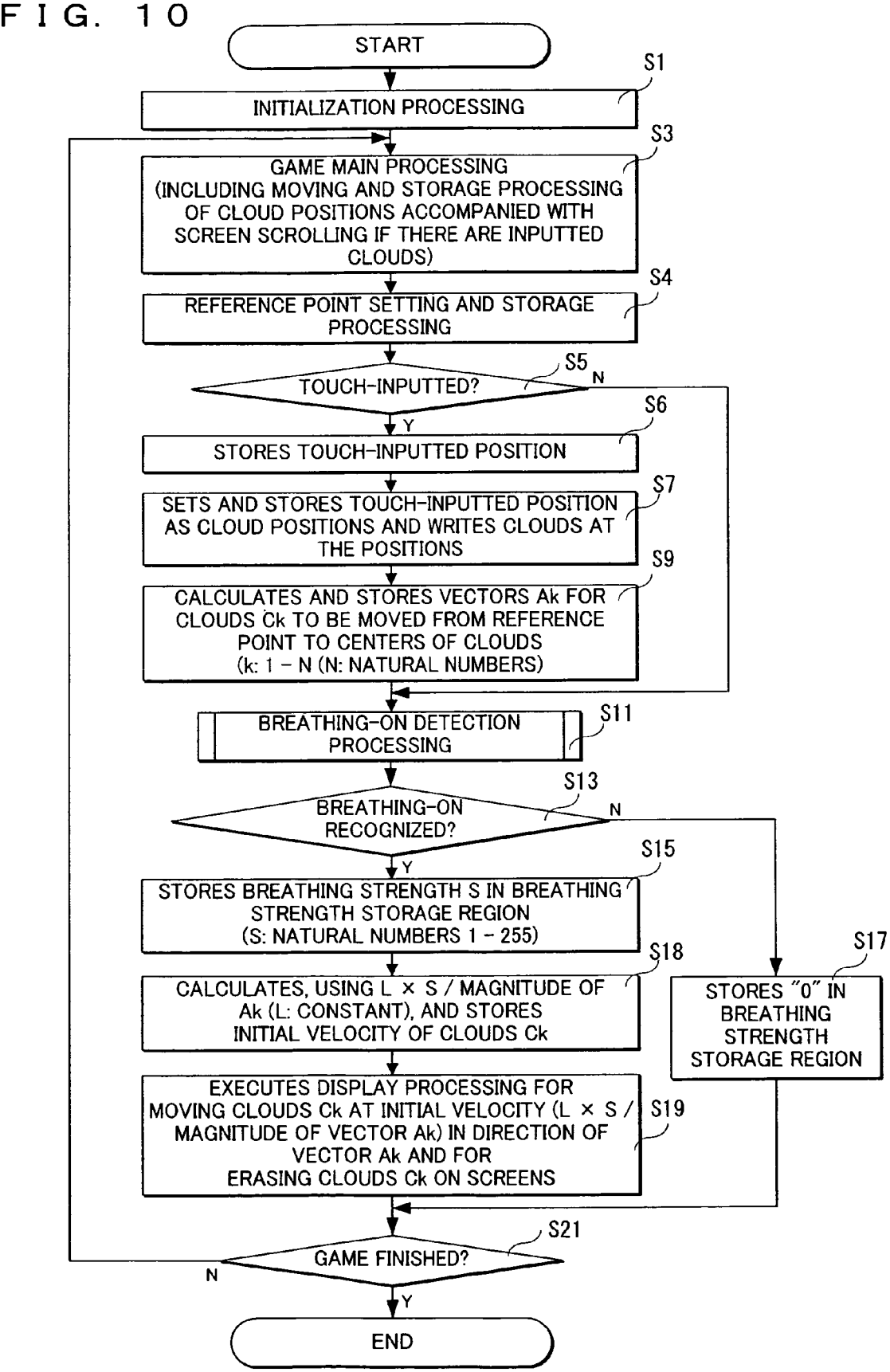
FIG. 10 is a flowchart showing a game process in the first example, which is executed by a CPU core shown in FIG. 2.

FIG. 4 shows a view in which an operator breathing on the microphone 34 and thereby the plurality of clouds C1 to C4 are being blown away. These clouds C move in directions of vectors A at an initial velocity (constant L×breathing strength S/magnitude of vector A). The vectors A span from a reference point 105 to centers of the clouds C. Referring to FIG. 10, details of this process will be described hereinafter.

As described above, in this game, the clouds C are blown away by the sound of breathing. In this case, if the operator outputs sounds other than the sound of breathing and thereby the clouds C are blown away, a situation which is not intended by the operator will occur. Therefore it is desired that the sound of breathing and other sounds be discriminated with high precision.

For example, there has been a technique in which a waveform pattern of a speech element of the breathing-on sound (breathing sound) is previously stored and the stored speech element is compared with a speech element of an inputted sound, thereby determining whether or not a player blows a breath. And there has also been another technique in which a spectrum of an inputted sound is calculated through fast Fourier transform (FFT) process and the calculated spectrum is compared with a spectrum of a previously stored breathing sound, thereby determining whether or not the player blows a breath.

In general, however, since the waveform pattern of the breathing sound varies depending on a player's physique, a breathing strength outputted by the player, etc., in the former technique, in order to improve a recognition rate of the breathing sound, it is necessary to store various patterns of the speech element in a memory. In other words, an increase in a memory capacity will accrue. If the number of speech elements stored in the memory is decreased in order to avoid the increase in the memory capacity, various breathing sounds of different waveform patterns cannot be precisely recognized, reducing the recognition rate.

And in the latter technique, although whether the player breathes on can be precisely recognized because the spectrum of the breathing sound can be measured with significant precision, a complicated calculation process is required, resulting in a heavy burden on the process.

Therefore, in the first example, whether the player breathes on is determined based on zero crosses of a waveform of an inputted sound. In the first example and the following examples, however, the above-mentioned techniques may be employed.

Figure 6:
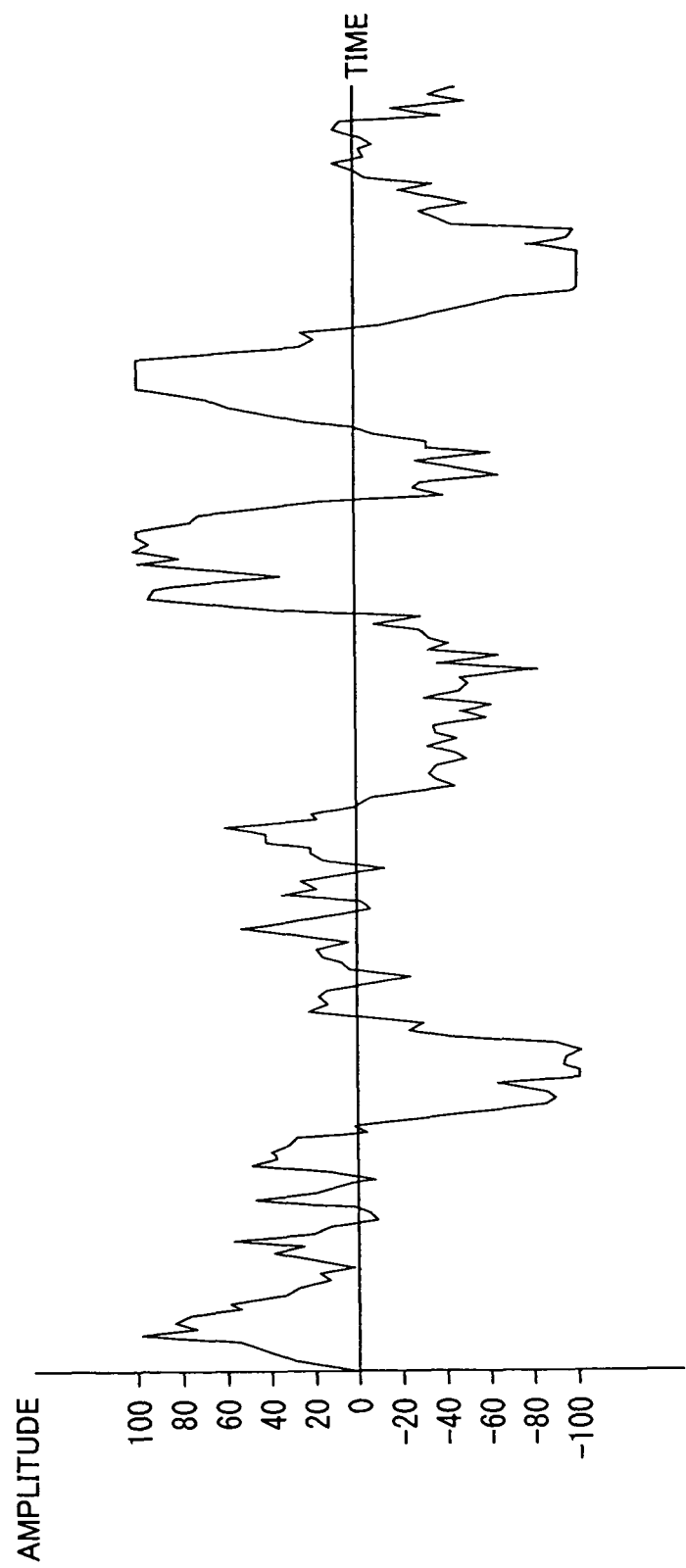
FIG. 6 is a graph showing variation of a waveform, over time, of a breathing-on sound inputted via a microphone.

FIG. 6 shows an example of a waveform generated when a breath is blown on the microphone 34, i.e., a waveform of the breathing sound. As is well known, the zero cross is an intersection (boundary point) crossing at a 0 level on a sound waveform appearing when a value of an amplitude shifts from plus to minus and from minus to plus. Based on the intervals t (msec) of the zero crosses, it is determined whether or not the player is breathing on. In the first example, focused on are the zero crosses appearing when the amplitude of the sound wave shifts from minus to plus. Therefore, as shown in FIG. 7, a zero cross interval t is a time length defined by two consecutive zero crosses appearing when the value of the amplitude of the sound wave shifts from minus to plus. In other words, a period (frequency) of each wave included in the sound wave is calculated.

However, an interval t to be detected may be a time length defined by two consecutive zero crosses appearing when a value of an amplitude of a sound wave shifts from plus to minus.

Although a unit of the interval t is "msec" in order to simplify description here, strictly, a sampling rate of the CPU core 42 is 1/8000 sec and the unit of the interval t is "1/8000 sec", which is also applied in the specification hereinafter.

In the present example, focused on are the zero crosses appearing when the value of the amplitude of the sound wave shifts from minus to plus or plus to minus and this is to eliminate a wasteful process.

As described above, in the first example, based on the zero cross interval t, it is determined whether or not the player is breathing on. Upon this determination, reference data 482c (stored in a data storage region 482 of a RAM 48) as shown in FIG. 8 is referred to. The reference data 482c is data empirically obtained through experiments or the like, and if an inputted sound satisfies any of conditions included in the reference data 482c, the inputted sound is regarded as a part of a breathing sound and if this circumstance continues for a predetermined duration (two consecutive frames in the first example), the inputted sound is determined (recognized) as a breathing sound. When the inputted sound is determined as the breathing sound, based on the number of zero crosses, a breathing (wind) strength is detected (determined).

The reference data 482c is represented as a table data shown in FIG. 8. In other words, in the reference data 482c, values f based on the number of zero crosses in 8 frames and distribution of intervals t for each area number have been stored. Here, a "frame" is used for showing a unit time for updating a screen (game image) and for example, is set to 1/60 seconds. The numbers described in columns of areas are identification information for identifying the range of the values f. In columns of the values f, shown are ranges of values obtained by multiplying by 8 the number of zero crosses (zero crosses appearing when shifting from minus to plus) in past (nearest preceding) 8 frames stored in a buffer, i.e., the data storage region 482. Four groups (A, B, C, and D) of the distribution of the intervals t have been stored and the classification of the groups is in accordance with the range of the intervals t. Specifically, the range of the intervals t in the group A is 2 to 25 (26≤t≤50) the range of the intervals t in the group B is 26 to 50 (26≤t≤50); the range of the intervals t in the group C is 51 to 75 (51≤t≤75); and the range of the intervals t in the group D is more than or equal to 76 (t≥76). For the values of each group, setting ranges or setting values ("1<xA<5", etc. as shown in FIG. 8) of the intervals t have been stored. These setting ranges and setting values are conditions for detecting the distribution of the zero cross intervals t in a sound waveform in 1 frame.

For example, if the value f, which is 8 times the number of zero crosses of an inputted sound waveform in 8 frames, is in a range of 200 to 299, the area 2 is selected. Next, it is determined whether or not distribution of intervals t of zero crosses of the sound waveform in a frame immediately preceding a current frame satisfies respective conditions of the groups A, B, C, and D in the area 2 (here, 2<xA<40, 1<xB<19, 0≤xC<9, 0≤xD <6). In other words, it is determined whether or not the distribution of the intervals t of the inputted sound waveform satisfies that shown in the reference data. Specifically, the intervals t in the waveform of an inputted sound are detected and classified into any of the groups A, B, C, or D; the number of intervals t belonging to each of the groups is counted; and it is determined whether the counted values (xA, xB, xC, and xD) of the each group are in a previously set range of values. However, if values, instead of the range of values, are set, it is determined whether the values are satisfied. When a state satisfying these conditions continues in 2 or more frames, the inputted sound is determined as a breathing sound. At this time, based on the values f, a breathing (wind) strength is determined. For example, the breathing (wind) strength is represented as a value of 1 to 255 (binary data of 8 bits: "00000001" to "11111111") and calculated based on the values f. Specifically, the breathing (wind) strength is calculated by using a equation 1.

$$S=(f/7)-13 \quad \text{[equation 1]}$$

Figure 9:
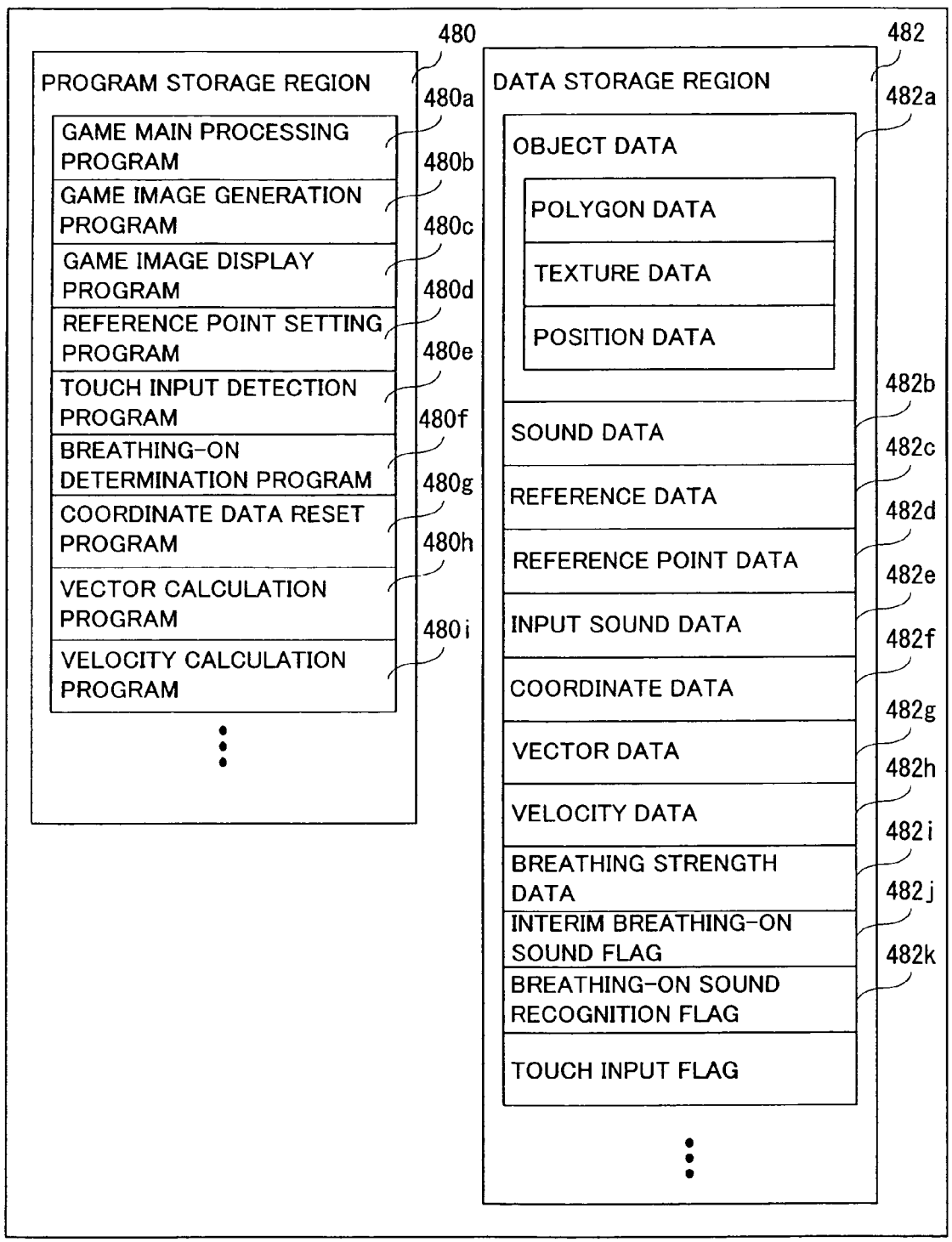
FIG. 9 is a diagram showing a memory map of a RAM incorporated in the game apparatus shown in FIG. 2.

FIG. 9 is a diagram showing a memory map of the RAM 48 shown in FIG. 2. In FIG. 9, the RAM 48 includes a game program storage region 480 and the data storage region 482. The game program storage region 480 has stored the game program, executed by the CPU core 42, which comprises a game's main process program 480a, a game image generation program 480b, a game image display program 480c, a reference point setting program 480d, a touch input detection program 480e, a breathing-on determination program 480f, a coordinate data reset program 480g, a vector calculation program 480h, and a velocity calculation program i.

The game's main process program 480a is a program for processing a main routine of the game as described above. The game image generation program 480b is a program for generating game images such as the player character 102, enemy characters (the enemy character 110, etc.), non-player objects (the coin 108, the balloon 122, a rocket, a UFO, etc.) other than the enemy characters, and background objects (a sky, the clouds C, the clouds 106, etc.), by using image data 482a described hereinafter. The game image display program 480c is a program for displaying on the LCD 12 and the LCD 14 the game images, i.e., the game image 100 and the game image 120 as described above, generated by executing the game image generation program 480b. In the present example, however, the CPU core 42 executes scrolling of the game image 100 and the game image 120 by executing the game image display program 480c.

The reference point setting program 480d is a program for setting a position of the reference point 105 shown in FIG. 4. The touch input detection program 480e is a program for detecting, per predetermined time (1 frame in the present example), whether or not the player is touch-inputting; controlling on (a breathing sound)/off (not a breathing sound) of a touch input flag 482l described hereinafter; and when there is a touch-input, storing (temporarily storing), in the data storage region 482c, coordinate data corresponding to the touch-inputted coordinates detected, in accordance with a time series. However, whether or not there is a touch-input is determined by whether or not coordinate data is inputted from the touch panel 22.

The breathing-on determination program 480f is a program for determining whether or not an inputted sound is a breathing sound. The coordinate data reset program 480g is a program for resetting (erasing) the coordinate data, of 1 or of 2 or more stored in the coordinate data storage region 482f when a state (on) where there is a touch-input shifts to a state (off) where there is no touch-input.

The vector calculation program 480h is a program for calculating a vector A spanning from the reference point 105 to the center of the cloud C. The velocity calculation program 480i is a program for calculating a velocity at which the cloud C is to be blown away when there is a breathing sound.

Though not shown in the figures, in the game program storage region 480, a sound reproduction program, a backup program, etc. are also stored. The sound reproduction program is a program for reproducing sounds (music) required for a game by using sound (music) data. And the backup program is a program for storing (saving), on the RAM 28b of the memory card 28, data (temporary and resulting data of the game) generated along with proceeding of the game, in accordance with a player's instruction at predetermined timing (event).

In the data storage region 482, stored are data such as object data 482a, sound data 482b, reference data 482c, reference point data 482d, input sound data 482e, coordinate data 482f, vector data 482g, cloud velocity data 482h, and breathing strength data 482i and provided are an interim breathing-on sound flag 482j, a breathing-on sound recognition flag 482k, and a touch input flag 482l. The codes 482a, 482b, 482c, 482d, 482e, 482f, 482g, 482h, 482i, 482j, 482k, and 482l also refer to respective data storage regions.

The object data 482a is used for generating object images, includes image data such as polygon data and texture data, and includes data (position data) regarding object positions (coordinates). Though not shown in the figures, the object data 482a is stored for each object.

The sound data 482b is required for reproducing sounds (music) necessary for the game. The reference data 482c is the table data as shown in FIG. 8 and used for a breathing-on determination process (see FIG. 11 and FIG. 12) described hereinafter. The input sound data 482e is a sound signal (audio data) inputted via the microphone 34. In the first example, sound data in at least 8 frames is registered (temporarily stored) in the data storage region 482.

The coordinate data 482f is detected by executing the touch input detection program 480e; is the stored coordinate data of 1 or of 2 or more; and is sequentially stored in chronological order. The vector data 482g is data of the vectors A, calculated by executing the vector calculation program 480h, spanning from the reference point to the centers of the clouds C. The cloud velocity data 482h is data associated with a velocity of the cloud C calculated by executing the cloud velocity calculation program 480i.

The interim breathing-on sound flag 482j is turned on (a breathing sound)/off (not a breathing sound) in the breathing-on determination process. The interim breathing-on sound flag 482j is turned on when an inputted sound is regarded as a part of a breathing-on sound and off when the inputted sound is regarded as not being a part of a breathing-on sound. For example, the interim breathing-on sound flag 482j comprises a register of 1 bit and when the flag is turned on, a data value "1" is set in the register and when the flag is turned off, a data value "0" is set in the register. Also the breathing-on sound recognition flag 482k is turned on/off in the breathing-on determination process. The breathing-on sound recognition flag 482k is turned on when an inputted sound is determined (recognized) as a breathing-on sound and off when the inputted sound is determined as not being a breathing-on sound. For example, the breathing-on sound recognition flag 482k comprises a register of 1 bit and when the flag is turned on, a data value "1" is set in the register and when the flag is turned off, a data value "0" is set in the register.

The touch input flag 482l indicates an on/off state of touch input and is turned on/off by executing the touch input detection program 480e. In this example, the touch input flag 482l comprises a register of 1 bit and when a touch input is on, a data value "1" is set in the register and when a touch input is off, a data value "0" is set in the register.

Though hot shown in the figures, other data such as game data (temporary data and resulting data) and other flags such as an event flag are stored in the data storage region 482.

Specifically, the CPU core 42 shown in FIG. 2 executes a game process shown in FIG. 10. In FIG. 10, when starting the game process, the CPU core 42 executes an initialization process at step S1. Here, the player character 102, the non-player objects, and the background objects are set at initial positions and the buffer or the like is cleared. However, saved game data may be read from the RAM 28b of the memory card 28 and loaded to the RAM 48.

At step S3, the game's main process is executed. Here, an image process (animation process) regarding objects (the non-player objects and the background objects) other than the player character 102, a sound reproduction process, a backup process, etc., are executed.

As described hereinafter, when inputted clouds C exist on the LCD 12 and the LCD 14, the clouds C are regarded as a part(s) of the background objects. Therefore, accompanied with scrolling of the game screen image so that the player character 102 is displayed as if the player character 102 were descending, the clouds C also move. In this case, the movement of the clouds C differs from the movement performed through breathing-on the microphone 34. A process at step S3 includes the movement process regarding positions of the clouds C accompanied with the scrolling of the game screen image and a storage process of the positions in the storage region 482a.

At step S4, by executing the reference point setting program 480d, setting and a storage process of the reference point 105 shown in FIG. 4 are executed. The reference point 105 is set outside the LCD 14 and at a position below the LCD 14 as shown in FIG. 4. The reference point is not at a fixed position in the map 109 shown in FIG. 5. The reference point 105 is set at a position (x+dx, y−dy) where a position 107 (coordinates (x, y)), at a left upper corner, is shifted by a length dx in an x direction and by a length dy in a y direction. The dx is equal to a value half a width of the LCD 14. The coordinate position of the reference point 105 is consecutively updated, accompanied with the scrolling of the background image screen (however, a relative position to the LCD 14 does not change). The updated coordinate positions of the reference point 105 are stored in the storage region 482d while the storage region 482d is being consecutively updated.

At step S5, whether or not there is a touch input is determined. In a case of "NO" at step S5, i.e., when there is no touch input, the CPU core 42 proceeds to step S11 (breaching-on determination process) described hereinafter. Though not shown in the flowchart, at this time the CPU core 42 turns off the touch input flag 482l.

On the other hand, in a case of "YES" at step S5, i.e., when there is a touch input, the touch input position is stored in the storage region 482f, for the coordinate data, of the RAM 48 at step S6. At step S7, the CPU core 42 stores positions of the clouds C, in the data storage region 482a, as touch-inputted positions at this time point. And with reference to the touch-inputted positions stored in the storage region 482, drawings of the clouds are produced. In other words, at step 7, the clouds C are displayed based on coordinates inputted from the touch panel 22.

As described at step S3 above, however, because the clouds C are the background objects, the positions of the clouds C are updated accompanied with the screen scrolling. The CPU core 42 consecutively stores the updated positions of the clouds C in the data storage region 482a. And the clouds C are displayed at the updated positions.

The clouds C1, C2, C3, and C4 are displayed in accordance with trajectories touch-inputted by the player. Though not shown in the flowchart, at this time, the CPU core 42 turns on the touch input flag 482l.

At step S9, with reference to the reference point data stored in the storage region 482d and the position data, of the clouds C, stored in the storage region 482a, the CPU core 42 calculates vectors A1 to A4, spanning from the reference point 105 to the centers of the cloud C1 to C4, regarding the respective produced clouds C1 to C4, by executing the vector calculation program 480h, and stores the vectors in the storage region 482g.

At step S11, the breathing-on determination process (see FIG. 11 and FIG. 12) described hereinafter in detail is executed and at step S13, whether or not the breathing-on is recognized is determined. Specifically, whether or not the breathing-on recognition flag 482k is on is determined. In a case of "YES" at step S13, i.e., when the breathing-on sound recognition flag 482k is on, the recognition of the breathing-on is determined. At step S15, a value of a breathing (wind) strength S is stored in the breathing strength data storage region 482i and the CPU core 42 proceeds to step S18. However, in a case of "NO" at step 13, i.e., when the breathing-on sound recognition flag 482k is off, no recognition of the breathing-on is determined. At step S17, "0" is stored in the breathing strength data storage region 482i and the CPU core 42 proceeds to step S21.

Here, the breathing strength S stored in the storage region 482i is to determine whether or not the clouds C are to be moved or at what velocity each cloud C is to be moved, and the breathing (wind) strength is represented as numerical values (1 to 25). When "0" is stored in the breathing strength data storage region 482i, the clouds C are not to be moved.

At step S18, with reference to the breathing strength S stored in the storage region 482i and the vectors A stored in the storage region 482g, the CPU core 42 calculates an initial velocity of each cloud Ck (k: natural numbers 1 to 4) displayed on the LCD 14, by executing the cloud velocity calculation program 480i, by using (constant L×breathing strength S/magnitude of vector Ak). In other words, the initial velocity is proportional to the breathing sound strength S and inversely proportional to the magnitude of the vector Ak. The CPU core 42 stores these initial velocity data and moving direction data (direction of the vector Ak) in the storage region 482h.

At step S19, with reference to the velocity data stored in the data storage region 482h, the CPU core 42 executes a display process for moving each cloud Ck at the initial velocity (constant L×breathing strength S/magnitude of vector Ak) in the direction of the vector Ak, by executing the image display program 480c. For this movement, the CPU core 42 conducts the display process so that each cloud Ck decelerates as time passes. However, the cloud decelerates to a small extent and unless the breathing strength is considerably weak, the CPU core 42 conducts the display process so that each cloud Ck appears as if the cloud Ck were blown away from inside to outside of the LCD 12 and the LCD 14. In other words, when the operator breathes on the microphone 34, the CPU core 42 conducts the display process so that the cloud C is erased.

At step S21, whether or not the game is finished is determined. In other words, it is determined whether or not the player instructs finishing the game, or whether or not the game is over. In a case of "NO" at step S21, i.e., when the game is not finished, the CPU core 42 returns to step S3. On the other hand, in a case of "YES" at step S21, i.e., when the game is finished, the CPU core 42 ends the game process.

The process routine in FIG. 10 is executed repeatedly per unit of time (for example, 1 frame). Therefore the touch input detection process at step S5 and the breathing-on determination process (sound detection process) at step S11 are executed per unit of time.

Figure 11:
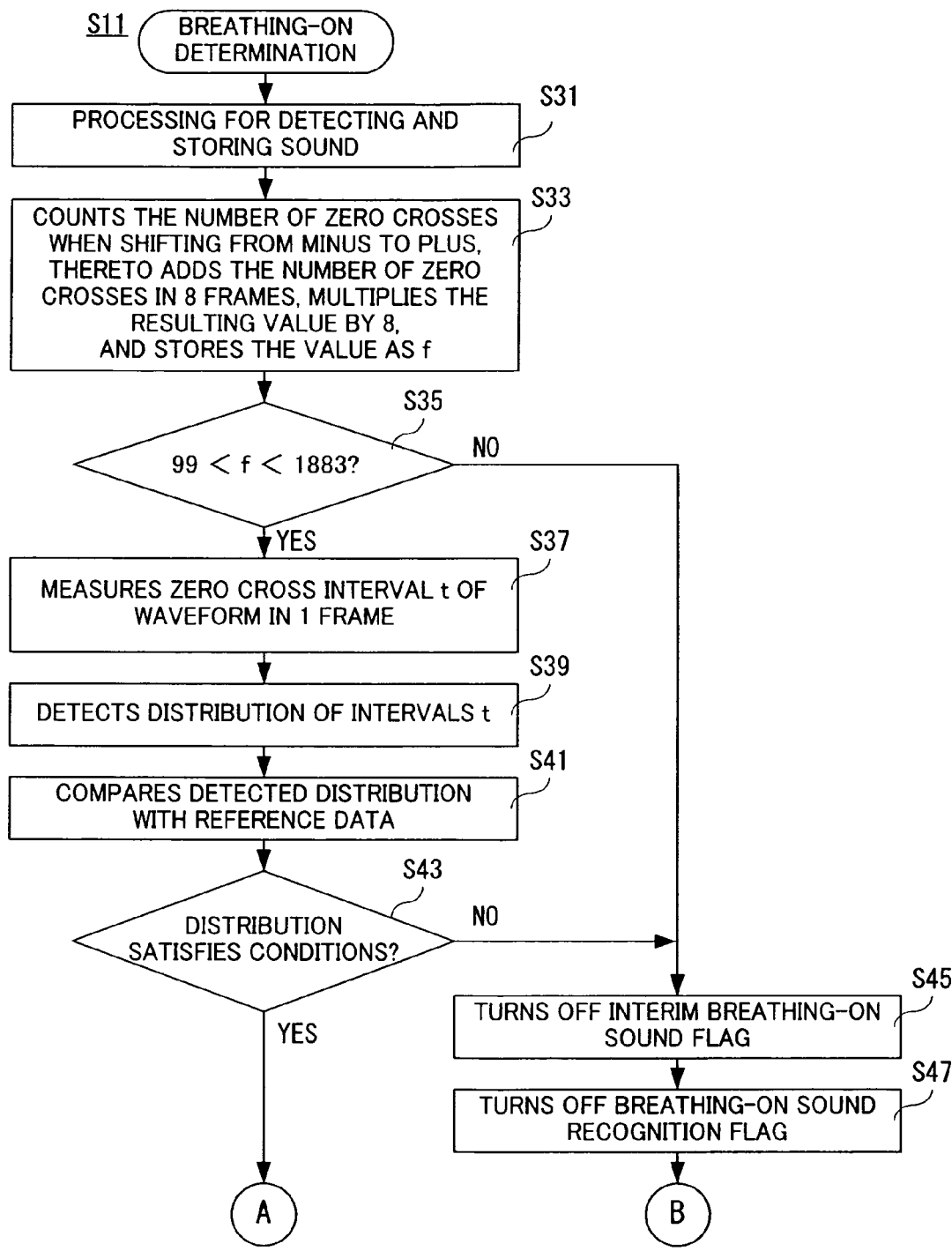
FIG. 11 is a flowchart showing apart of the breathing-on determination process executed by the CPU core shown in FIG. 2.

FIG. 11 and FIG. 12 are flowcharts showing the breathing-on determination process at step S11 shown in FIG. 10. As shown in FIG. 11, when starting the breathing-on detection process, the CPU core 42 executes the sound detection process at step S31. And sound data corresponding to a sound inputted via the microphone 34 is stored in the data storage region 482. When the sound detection process is executed, a noise gate process is also executed. Specifically, sound data less than or equal to a predetermined level is regarded just as noise and excluded (rejected) from the inputted sound data. At step S33, the number of zero crosses is counted in the buffer (buffer region of the RAM 482) and a value f (numerical value f) obtained by multiplying by 8 the zero crosses, appearing when a value of an amplitude of a sound waveform shifts from minus to plus, in nearest preceding 8 frames is stored. In other words, with reference to the input sound data 482e, the value f is obtained.

At step S35, whether the value f is in a range of 98 to 1883 ($98 \leq f \leq 1883$) is determined. Here, whether or not the inputted sound is the breathing sound is determined in a simplified manner. The reason why the above range is set is that it is empirically known that when a breathing (wind) sound is blown on the microphone 34, the value f is in the above range ($98 \leq f \leq 1883$). In a case of "NO" at step S35, i.e., when the value f is less than or equal to 97 but more than or equal to 1884, the CPU core 42 proceeds directly to step S47. On the other hand, in a case of "YES" at step S35, i.e., when the value f is in the range of 98 to 1883, the zero cross intervals t in 1 frame are measured at step S37. Here, as described with reference to FIG. 7, the intervals t between zero crosses appearing when the value of the amplitude of a sound wave shifts from minus to plus are respectively measured.

At step S39, distribution of intervals t is detected. In other words, the measured intervals t are classified into the groups. Specifically, the intervals t measured at step S37 are classified into the group A, B, C, or D in accordance with time lengths which are set for the respective groups and the numbers of the intervals t belonging to the respective groups are counted. Thus the counted values (xA, xB, xC, and xD) are obtained. At step S41, the distribution detected at step S39 is compared with the reference data 482c. An area (number) is selected according to the value f, and it is determined whether the counted values (xA, xB, xC, and xD) are in each range of the groups, which is set for the selected area, or whether the counted values match the set values.

At step S43, whether or not the distribution satisfies the conditions is determined. In other words, it is determined whether the values (xA, xB, xC, and xD) obtained at step S39 are in each range of the group A, B, C, or D, respectively or whether the values match the set values. Here, when all the values are in the set ranges or match the set values, the distribution is determined as satisfying the conditions (the distribution of frequencies of the inputted sound waveform matches that of the reference data), and if even a set range or a set value is not satisfied, the distribution is determined as not satisfying the conditions (the distribution of frequencies of the inputted sound waveform does not match that of the reference data). In a case of "YES" at step S43, i.e., when the distribution satisfies the conditions, the inputted sound is determined as a part of a breathing-on sound and the CPU core 42 proceeds to step S49 shown in FIG. 12. However, in a case of "NO" at step S43, i.e., when the distribution does not satisfy the conditions, the inputted sound is determined as not a part of the breathing-on sound; the interim breathing-on sound flag 482j is turned off at step S45; further the breathing-on sound recognition flag 482k is turned off at step S47; and the breathing-on determination process ends as shown in FIG. 12.

As shown in FIG. 12, at step S49, whether or not the interim breathing-on sound flag 482j is on is determined. In other words, it is determined whether or not the inputted sound is regarded as being a part of the breathing-on sound in two consecutive frames. In a case "YES" at step S49, i.e., when the interim breathing-on sound flag 482j is on, the inputted sound is determined as a breathing-on sound; the breathing-on sound recognition flag 482k is turned on at step S51; and at step S53, a breathing strength S is calculated by using the equation 1 and stored in the breathing strength data storage region 482i. The breathing-on determination process ends. On the other hand, in a case of "NO" at S49, i.e., when the interim breathing-on sound flag 482j is off, the inputted sound is determined as not a part of the breathing-on sound in 2 consecutive frames; the interim breathing-on sound flag 482j is turned on at step S55; and the breathing-on determination process ends.

In the first example, a moving velocity of the cloud C is inversely proportional to a magnitude of the vector A spanning from the reference point 105 to the center of the cloud C. Therefore even if the game player blows a breath of the same strength on the microphone 34, the clouds C can be displayed so that the cloud C in the vicinity of the reference point 105 moves in a fast manner and the cloud C at a position remote from the reference point 105 moves in a relatively slow manner. Because the clouds C move in the same directions of the vectors A, the game player blows a breath on the microphone 34 and thereby the clouds C can be displayed so that the plurality of clouds C are blown away in a divergent manner from the reference point 105.

As described above, according to the first example, for example, even if the game player blows a breath of the same strength, the clouds C do not move constantly at the same velocity in the same direction, but the moving velocities and the moving directions of the clouds C vary depending on the positions of the clouds C. Therefore according to the first example, a game which visually amuses a game player, which is an important factor for a game, can be realized.

According to the first example, because the inputted sound is determined as a breathing-on sound when the distribution of the intervals of zero crosses matches the previously set distribution and this state continues for a predetermined duration, a breathing-on operation can be accurately recognized.

In the first example, because only the table data such as reference data is stored, as compared with a case where data of waveforms patterns of various speech elements are stored, a memory capacity can be reduced.

In the first example, because only the distribution of the intervals of zero crosses is detected, a burdensome calculation process is not required, thus reducing a processing burden on a CPU.

Furthermore, because a breathing or wind strength is set according to the number of zero crosses in the waveforms of an inputted sound, the breathing or wind strength can be easily set (detected). In addition, because game processes (image processes) which vary according to the breathing or wind strength are executed, amusement of the game can be enhanced.

Although in the first example, the game apparatus comprises two LCDs, a game apparatus may comprise only one LCD or a game apparatus may comprise no touch panel.

Alternative Example

Figure 13:
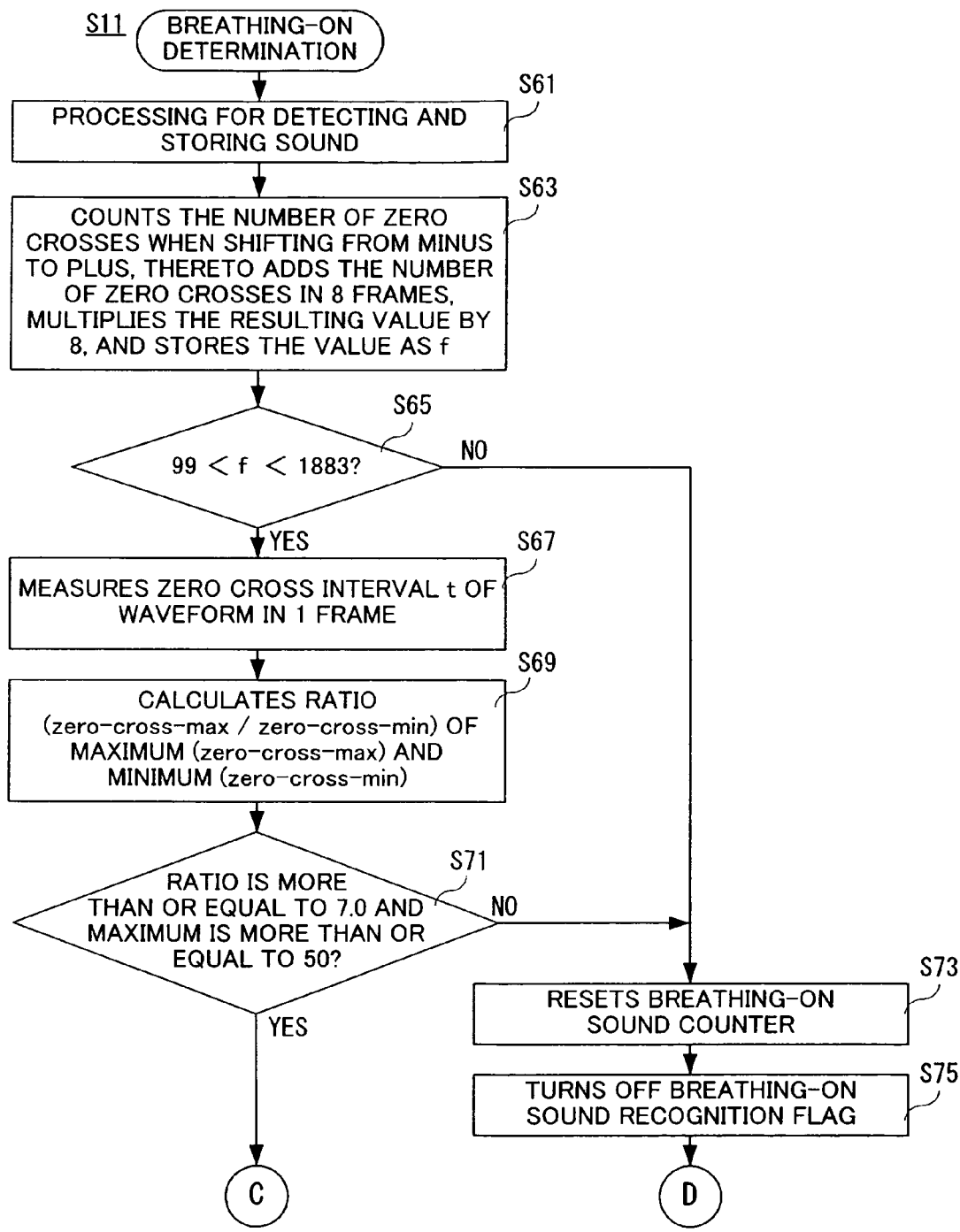
FIG. 13 is a flowchart showing a part of breathing-on determination process in an alternative example of the present invention.
Figure 14:
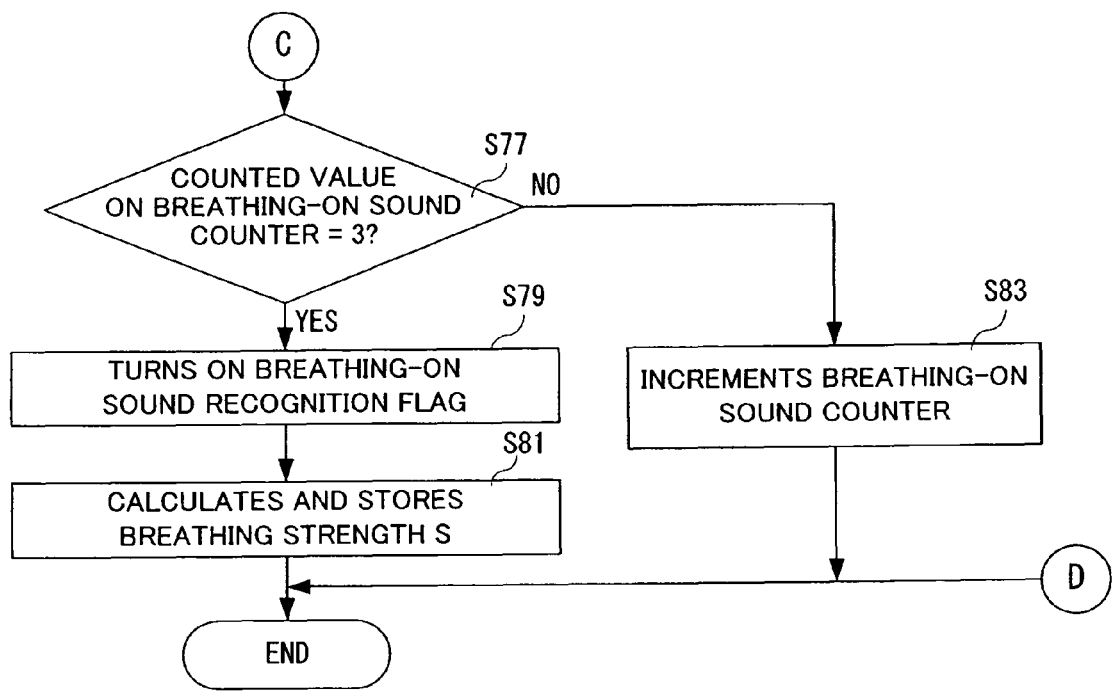
FIG. 14 is a flowchart showing another part of the breathing-on determination process, which follows the breathing-on determination process shown in FIG. 13.

Since a game apparatus of an alternative example is similar to the game apparatus of the first example except that a breathing-on determination process is different, most of overlapping description will not be given. In this alternative example, whether or not an inputted sound is determined (recognized) as a breathing-on sound based on a maximum value and a minimum value of intervals t of zero crosses in an inputted sound waveform. Therefore the reference data 482c shown in the first example is not needed, reducing a memory capacity. FIG. 13 and FIG. 14 are flowcharts of a specific breathing-on process. The same process as that described in the first example will be briefly described. In the breathing-on process in the alternative example, an inputted sound is determined as a breathing-on sound when a part of the breathing-on sound continues in three frames. Therefore instead of the interim breathing-on sound flag 482*j* shown in the first example, a counter (not shown) for counting the duration (the number of frames) for which the inputted sound is regarded as a part of the breathing-on sound is provided, for example, in the data storage region 482 of the RAM 48.

In FIG. 13, when starting a breathing-on determination process, the CPU core 42 executes a sound detection process at step S61. Here, a noise gate process is executed, which is the same as at S31 in the first example. At step S63, the number of times of crossing at an amplitude zero point, in the sound waveform in a buffer, from minus to plus is counted and a value obtained by multiplying by 8 the number of times in 8 nearest preceding frames is stored as a value f. At step S65, whether or not the value is in a range of 98 to 1883 is determined. In a case of "NO" at step S65, the CPU core 42 proceeds to step S73. On the other hand, in a case of "YES" at step S65, intervals t of respective crosses included in a waveform of 1 frame are measured at step S65.

At step S69, a ratio (zero-cross-max/zero-cross-min) of the maximum value (zero-cross-max) to the minimum value (zero-cross-min) of the intervals t is calculated. At step S71, it is determined whether or not the ratio calculated at step S69 is more than or equal to a first predetermined value (7.0 here) and the maximum value is more than or equal to a second predetermined value (50 (1/8000 sec) here). In other words, whether or not the intervals t between zero crosses satisfies predetermined conditions is determined. In a case of "YES" at step S71, i.e., when the ratio is more than or equal to 7.0 and the maximum value is more than or equal to 50 (1/8000 sec), the inputted sound is determined as a part of the breathing-on sound and the CPU core 42 proceeds to step S77 shown in FIG. 14. However, in a case of "NO", i.e., when the ratio is less than 7.0 and/or the maximum value is less than 50 (1/8000 sec), the inputted sound is determined as not a part of the breathing-on sound; at step S73, a breathing-on sound counter is reset (counter value=0); at step S75, the breathing-on sound flag 482*k* is turned off; and as shown in FIG. 14, the breathing-on determination process ends. The first and the second predetermined values are obtained empirically by experiments or the like.

As shown in FIG. 14, at step S77, whether or not the value counted by the breathing-on sound counter is "3" is determined. In other words, whether or not the inputted sound is regarded as a part of the breathing-on sound in 3 consecutive frames. In a case of "YES" at step S77, i.e., when the value counted by the breathing-on sound counter is "3" (if 3 or more), the inputted sound is determined as a breathing-on sound; at step 79, the interim breathing-on sound flag 482*k* is turned on; and at step S81, a breathing (wind) strength S is calculated by using the equation 1 and stored in the breathing strength data storage region 482*i*. And the breathing-on determination process ends. In a case of "NO" at step S77, i.e., when the value counted by the breathing-on sound counter is not "3" (if less than 3), at step S83, the breathing-on sound counter is incremented and the breathing-on determination process ends.

In the alternative example, as similarly to the first example, when the number of zero crosses in the waveform of the inputted sound is in the predetermined range and the maximum value and the minimum value satisfy the predetermined conditions consecutively during the predetermined time, the inputted sound is determined as the breathing-on sound, enabling accurate recognition of the breathing-on operation.

In the alternative example, there is no need to provide the reference data, resulting in a further minimized memory requirement than that in the first example.

Second Example

In a second example of the present invention, a memory card 28 in which information different from that stored in the memory card 28 used in the first example has been stored is connected on the game apparatus 10 of the first example. Therefore since the hardware structure is the same as that in the first example, description for the hardware will not be given.

FIG. 15 shows a game screen image displayed on an LCD 14 in the second example. In the second example, an LCD 12 may be used and may not be used. FIG. 15 is a diagram showing a billiard game. On the LCD 14 in the FIG. 15, a plain view of a billiard table 202 is shown. At four corners of the billiard table 202, pockets (holes) 210 are formed. On the billiard table, disposed are balls (cue balls) 206 to be directly hit by a billiard cue 203 and balls (object balls) 208 to be dropped into the pockets 210 by hitting the cue balls 206. Positions of variable points 204 can be arbitrarily set by an operator. A magnitude of a vector A spanning from the variable point 204 to the cue ball 206 (with a position of the variable point 204 as a start point and a position of the cue ball 206 as an end point) is inversely proportional to an initial velocity of the cue ball 206 moving when the cue ball 206 is hit by the cue 203 and a direction of the vector A is a direction of the moving cue ball 206. A breathing strength S is proportional to the initial velocity of the cue ball 206.

Figure 16:
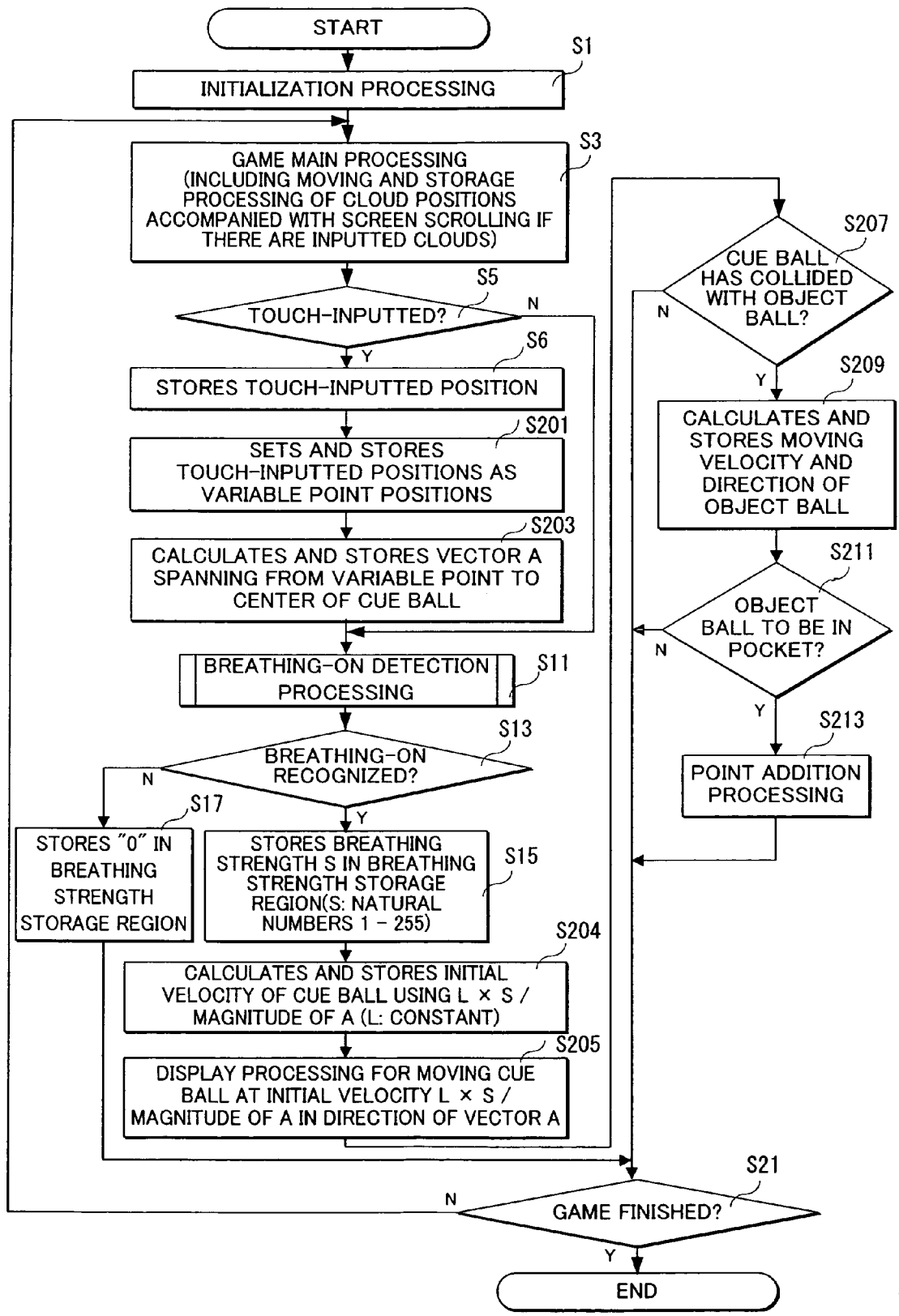
FIG. 16 is a flowchart showing a game process in the second example, which is executed by the CPU core shown in FIG. 2.

FIG. 16 is a flowchart showing a main process of the second example and is similar to FIG. 10 of the first example. FIG. 16 will be described with a focus on a part different from FIG. 10. First, at step S1, an initialization process is executed and at step S3, a game's main process is executed. The game's main process includes a process in which positions of the cue ball 206 and the object ball 208 are calculated as necessary and stored in a data storage region 482*a* as position data of objects. In a case "YES", i.e., when there is a touch input, at step 6, the touch-inputted position is stored in a coordinate data storage region 482*f* of a RAM 48.

At step S201, the variable point 204 is set at the touch-inputted position obtained by referring to the storage region 408*f*. A CPU core 42 stores the above-mentioned touch-inputted position as a position of the variable point 204 in a storage region 482*d*. At step S203, referring to the position data, stored in the storage region 482*a*, of the cue ball 206 and the position data, stored in the storage region 482*d*, of the variable point 204; the CPU core 42 calculates, by executing a vector calculation program 480*h*, and stores the vector A spanning from the variable point 204 to a center of the cue ball 206, in a storage region 482*g*.

At step S11, a breathing-on determination process (see FIG. 11 and FIG. 12) described in detail in the first example is executed and at step 13, whether or not a breathing-on sound is recognized is determined. In a case of "YES" at step S13, an inputted sound is determined as the breathing-on sound and at step S15, a value of a breathing strength S is stored in a breathing strength storage region 482*i* and the CPU core 42 proceeds to step S204. In a case of "NO" at step S13, it is determined that the inputted sound is not recognized as a breathing-on sound, and at step S17, "0" is stored in the breathing strength storage region 482*i* and the CPU core 42 proceeds to step S21.

Here, the breathing strength S stored in the breathing strength data storage region 482$i$ is to determine whether or not the cue ball 206 is to be moved and at what initial velocity the cue ball 206 is to be moved, and is represented as a value (1 to 255). When "0" is stored in the breathing strength data storage region 482$i$, the cue ball is not to be moved.

At step S204, referring to a breathing strength S stored in the breathing strength data storage region 482$i$ and a vector A stored in the storage region 482$g$, the CPU core 42 calculates, by executing the velocity calculation program 480$i$, an initial velocity of the cue ball 206 displayed on the LCD 14 by using a equation (constant L×breathing strength S/magnitude of vector A). The CPU core stores this initial velocity data and moving direction data (a direction of the vector A) in a storage region 482$h$.

At step S205, referring to the velocity data, stored in the storage region 482$h$, of the cue ball 206, the CPU core 42 executes, by executing an image display program 480$c$, a display process so that the cue ball 206 is hit by the cue 203 to be moved in the direction of the vector A and then, a display process so that the cue ball 206 is moved in the direction of the vector A at the initial velocity (constant L×breathing strength S/magnitude of vector A). For this movement, the CPU core 42 executes the display process, taking into account deceleration caused due to friction on an upper surface of the billiard table 202, so that the cue ball 206 decelerates as time passes.

At step S207, referring to the position data, stored in the storage region 482$a$, of the cue ball 204 and the object ball 208 and the velocity data, stored in the storage region 482$h$, of the cue ball 204, the CPU core 42 executes a process for determining whether or not the object ball 208 have collided with the cue ball 204, by executing a collision determination program. When the collision is determined, at step 208, referring to data stored in the storage region 482, the CPU core 42 calculates, by executing an object ball velocity calculation program, and stores a moving velocity and a moving direction of the object ball 208, in the storage region 482. Further, referring to the moving velocity and the moving direction, stored in the storage region 482, of the object ball 208, the CPU core 42 executes a moving display process. At step S211, referring to data stored in the storage region 482, the CPU core 42 determines, by executing a pocket-in determination program, whether or not the object ball 208, as a result of being moved, has been dropped into the pocket 210. When the object ball 208 is determined to be dropped into the pocket 210, at step 213, the CPU core 42 executes a game point addition process by executing a point processing program.

At step S21, whether or not the game is finished is determined. When it is determined that the game is not finished, the CPU core 42 executes the game's main process at step S3. When it is determined that the game is finished, the CPU core 42 ends the game. And similarly, in a case of "NO" at step S207 or step S211, at step S21, whether or not the game is finished is determined.

According to the second example, because when setting the initial velocity of the cue ball 206, a game player is requested to consider a distance between the variable point 204 and the center of the cue ball 206, in addition to the breathing strength, an amusing game can be offered. The game player can move the cue ball 206 in the direction, not in a fixed direction, of the vector A spanning from the variable point 204 to the center of the cue ball 206, enhancing amusement of a game.

Third Example

Also in a third example of the present invention, a memory card 28 in which information different from that stored in the memory card 28 used in the first example has been stored is connected on the game apparatus 10 of the first example.

FIG. 17 shows a game screen image displayed on an LCD 14 in the third example. In the third example, an LCD 12 may be used or may not be used. FIG. 17 shows a game which is a competition on how long a balloon 308 can be kept being between an upper limit line 310 and a lower limit line 312 by an upward airflow 314. The airflow 314 is outputted by an airflow output device 302. The airflow output device 302 can be moved right or left by operating a touch panel 22 or a cursor key 20$a$. A strength of the airflow 314 is a total (S+H) of a breathing strength S inputted via a microphone 34 and a height H of a meter 306 displayed at a right side on the LCD 14. Thus, an operator can control the balloon 308 by operating the touch panel 22 or the cursor key 20$a$ and breathing-on. The height H of the meter 306 changes automatically as time passes by executing a program in the memory card 28. Therefore when the height H of the meter 306 becomes high, the operator needs to weaken the breathing strength S to keep the balloon 308 being between the upper limit line 310 and the lower limit line 312. When the height H of the meter 306 becomes low, the operator needs to strengthen the breathing strength S to keep the balloon 308 being between the upper limit line 310 and the lower limit line 312. Thus, in this game, the operator is requested to adjust the breathing strength S as time passes while observing the height H of the meter 306.

Figure 18:
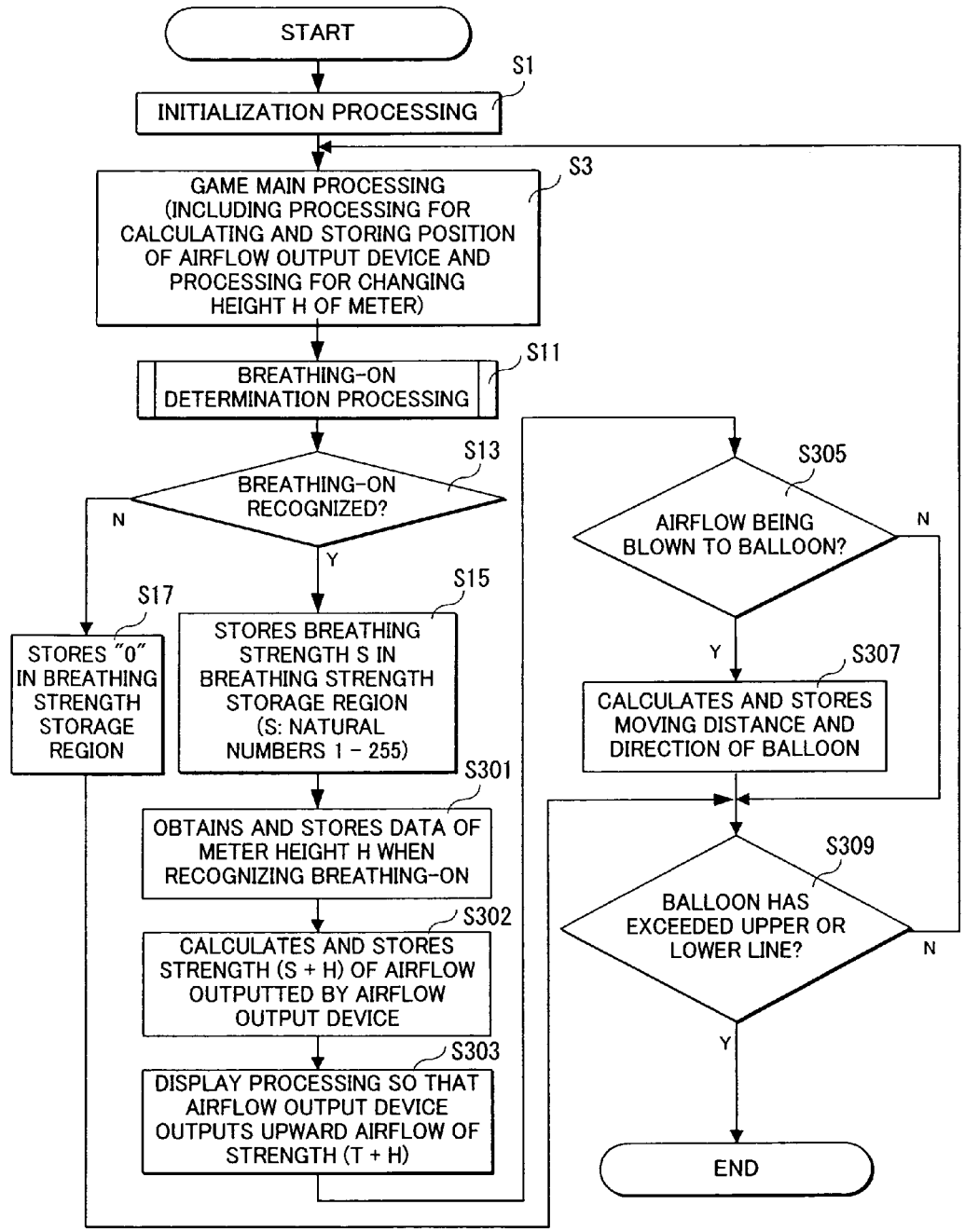
FIG. 18 is a flowchart showing a game process in the third example, which is executed by the CPU core shown in FIG. 2.

FIG. 18 is a flowchart showing a main process in the third example and is similar to FIG. 10 in the first example. FIG. 18 will be described with a focus on a part different from FIG. 10. A CPU core 42 executes at step S1 and then game's main process at step S3. The process at step S3 includes a process for calculating as necessary and storing positions of the airflow output device 302 and the balloon 308 in a storage region 482$a$ and a process for changing the height of the meter 306 as time passes. Unlike in the first example, after the process at step S1 and step S3, the CPU core 42 proceeds directly to step S11, executing a breathing-on determination process (see FIG. 11 and FIG. 12) and at step 13, determines whether or not breathing-on is recognized. In a case of "YES" at step 13, it is determined that the breathing-on is recognized; at step S15, a value of the breathing strength S is stored in a breathing strength data storage region 482$i$; and the CPU core 42 proceeds to step S204. In a case of "NO" at step S13, it is determined that the breathing-on is not recognized; at step S17, "0" is stored in the breathing strength data storage region 482$i$; and the CPU core 42 proceeds to step S309.

Here, the breathing strength S stored in the breathing strength data storage region 482$i$ is to determine whether or not the airflow output device 302 outputs the airflow 314 and what strength of the airflow 314 is outputted, and is represented as a value (1 to 255). When "0" is stored in the breathing strength data storage region 482$i$, the airflow 314 is not outputted.

At step S301, the CPU core 42 obtains and stores, in a data storage region 482, data of the height H of the meter 306 when the breathing-on is recognized and stores. At step S302, referring to the breathing strength S stored in the breathing strength data storage region 481$i$ and the height H of the meter 306 stored in the storage region 482 when the breathing-on is recognized, the CPU core 42 calculates, by executing an airflow strength calculation program, and stores the strength (S+H) of the airflow 314 in the storage region 482.

At step S303, referring to the strength (S+H), stored in the storage region 482, of the airflow 314, the CPU core 42 executes an information process and a display process, by executing an image display program, so that the airflow output device 302 outputs the airflow 314 of the strength (S+H).

At step S305, referring to the positions, stored in the storage region 482, of the output device 302 and the balloon 308 and the strength (S+H), stored in the storage region 482, of the airflow, the CPU core 42 determines whether or not the airflow 314 is being blown to the balloon 308 by executing an airflow blow determination processing program. When it is determined that the airflow 314 is being blown to the balloon 308, at step S307, referring to data stored in the storage region 482, the CPU core 42 calculates a moving distance and a moving direction of the balloon 308 by executing a balloon movement calculation program. At step S309, referring to data stored in the storage region 482, the CPU core determines, by executing a line exceeding determination program, whether the moved balloon 308 has exceeded the upper limit line 310 upward or the lower limit line 312 downward. Also after the above-mentioned process at step S17 and in a case of "NO" at step S305, the CPU core 42 executes the process at step S309.

In a case of "YES" at step S309, i.e., when it is determined that the balloon 308 has exceeded the upper limit line 310 upward or the lower limit line 312 downward, the game is finished. In a case of "NO" at step S309, the CPU core 42 returns to step S3 and executes the game's main process.

According to the third example, the game player is requested to adjust the breathing strength S as time passes, in accordance with the height H of the meter 306, which changes automatically as time passes, enhancing amusement of a game, as compared to a game in which a game player is requested to simply strengthen or weaken the breathing strength.

Fourth Example

Also in a fourth example of the present invention, a memory card 28 in which information different from that stored in the memory card 28 used in the first example has been stored is connected on the game apparatus of the first example.

A game in the fourth example is a competition game on how long it takes to inflate a balloon displayed on an LCD 14 so as to reach a predetermined size. An inflation velocity of the balloon is a total (S+E) of a breathing strength S and the number of times at which an A button 20d is pressed in a unit of time. Thus, since the game contents are clear without a diagram, a diagram of a screen image will not be given.

Figure 19:
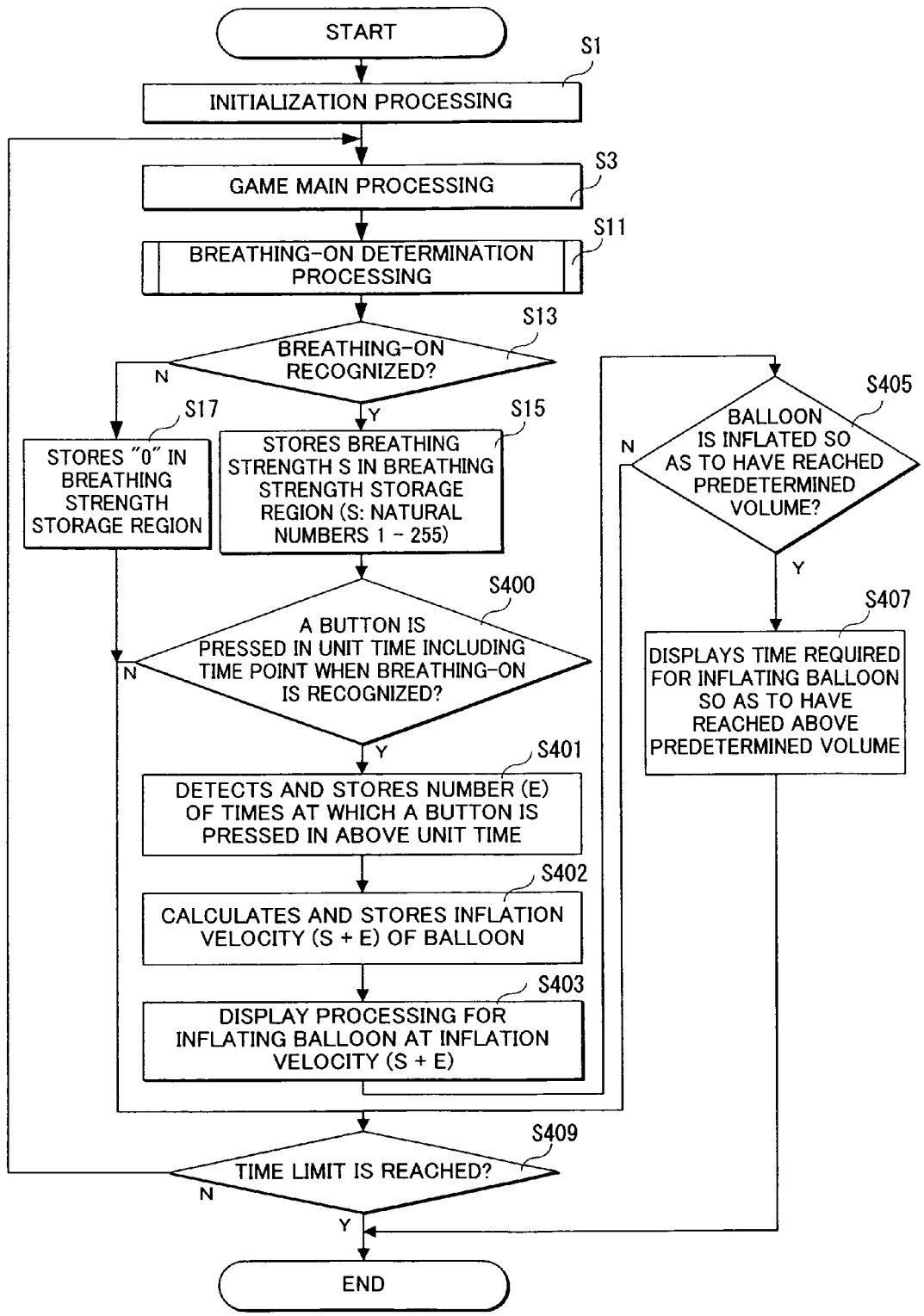
FIG. 19 is a flowchart showing a game proces in a fourth example, which is executed by the CPU core shown in FIG. 2.

FIG. 19 is a flowchart showing a main process of the fourth example and is similar to FIG. 10 of the first example. FIG. 19 will be described with a focus on a part different from FIG. 10. Unlike in the first example, after executing processes at step S1 and S2, a CPU core 42 executes immediately a breathing-on determination process (see FIG. 11 and FIG. 12) at step S11, and at step S13, determines whether or not breathing-on is recognized. In a case of "YES" at step S13, it is determined that the breathing-on is recognized; at step S15, a value of the breathing (wind) strength S is stored in a breathing strength data storage region 482i; and the CPU core 42 proceeds to step S204. In a case of "NO" at step S13, it is determined that the inputted sound is not the breathing-on sound; at step S17, "0" is stored in the breathing strength region 482i; and the CPU core proceeds to step S409.

Here, the breathing strength S stored in the breathing strength data storage region 482i is to determine whether or not the balloon is inflated or at what velocity the balloon is inflated and is represented as a value (1 to 255). When "0" is stored in the breathing strength data storage region 482i, the balloon is not to be inflated.

At step S400, the CPU core 42 detects whether or not the A button 20d is pressed in the unit of time, which includes a time point when the breathing-on is recognized. At step S401, the CPU core 42 detects and stores in the data storage region 482 the number E of times at which the A button 20d is pressed. At step S402, referring to the breathing strength S stored in the breathing strength data storage region 482i and the number E, stored in the data storage region, of times at which the A button 20d is pressed, the CPU core calculates, by executing a inflation velocity calculation program, and stores the balloon inflation velocity (S+E), in the data storage region 482.

At step 403, referring to the balloon inflation velocity (S+E) stored in the data storage region 482, the CPU core executes an information process and a display process, by executing an image display program 480c, so that the balloon is inflated at the inflation velocity (S+E).

At step S405, referring to the balloon inflation velocity (S+E) stored in the data storage region 482, the CPU core determines, by executing a balloon inflation determination program, whether or not the balloon has been inflated so as to have reached a predetermined volume. When it is determined that the balloon has been inflated so as to have reached the above-mentioned predetermined volume, the CPU core displays time required for inflating the balloon to have reached the predetermined volume and ends the game. In a case of "NO" at step 405, the CPU core 42 proceeds to step S409 and determines whether or not a time limit is reached. When the time limit is reached, the CPU core 42 ends the game. When the time limit is not reached, the CPU core 42 returns to step S3 and executes a game's main process. Also after executing a process at step S17 or in a case of "NO" at step S400, the CPU core proceeds to step S409.

According to the fourth example, a game player is requested not only to strongly blow a breath on a microphone 34, but also to repeatedly and quickly press the A button 20d to inflate the balloon at a high speed, enhancing amusement of a game, as compared to a game in which the balloon is inflated simply by breathing-on.

Hereinafter, technical ideas grasped from the examples of the present invention and interpretation of terms given in this specification will be described.

In the present specification, an "object" is broadly interpreted. The "object" includes not only "objects" generally used for representing characters and backgrounds in the field of a game but also every kind of an object which can be displayed on a game screen image. For example, letters or the like are also included in the "object".

An "object control amount" is broadly interpreted. For example, a moving velocity, a size, a volume, a temperature of an object, or the like are included. And a magnitude of an airflow outputted by an object, a magnitude of a sound outputted by an object, or the like are also included.

Amounts for controlling objects, properties possessed by the objects, attributes possessed by the objects, or the like, for some purposes, which an object possesses, are included in the above-mentioned "object control amount".

As a controlled object, for example, when an object outputs an airflow and another object is moved by this airflow, the another object is also included.

"Sound property data" are data showing some properties of a sound inputted via a microphone and include, for example, data of a sound (breathing) strength.

A "computer" or a processor (CPU, etc.) and a "memory" or the like included in the computer may be physically separated into 2 or more.

The "sound property data" are preferably data of a sound (more preferably, breathing) strength. The sound (breathing)

strength can be recognized and adjusted by an operator comparatively with ease, and also can be easily linked to the operator's emotion. The "sound property data" may be directly or indirectly obtained from information inputted via the microphone. In other words, without processing the information inputted via the microphone, data maybe directly obtained from the information inputted via the microphone. Or by referring to the information inputted via the microphone, the computer may be caused to execute a sound property data calculation step (S53, S81) for calculating property data of an inputted sound (breathing in particular) and a sound property data storage step for storing in the memory the sound property data calculated at the sound property data calculation step (S53, S81).

In claims, it is naturally possible to add, to the invention of a game apparatus, contents of dependent claims regarding a storage medium having stored a game program thereon. Contents of a game apparatus, which are described by replacing a term of "step" in claims regarding the storage medium with that of "section", "apparatus", or "means" are incorporated as contents of the present specification.

In the present specification, one means may be realized by two or more means physically separated and two or more means may be realized by one means physically integrated.

The control amount is preferably a magnitude in accordance with a total value of a first input variable and a second input variable. Further the control amount is preferably proportional or inversely proportional to the total value. Or The control amount is preferably proportional or inversely proportional to the first input variable and is preferably proportional or inversely proportional to the second input variable.

A first position and/or a second position are/is preferably a position of the object.

Here, the "position of the object" is typically a position inside a contour, for example, a center or the like, of the object. However, in the present specification, the "position of the object" is broadly interpreted as a "position associated with the object". Therefore, even when a position is outside the contour of the object, if the position is a position associated with the object, the position is deemed as the above-mentioned "position of the object". For example, even if a plurality of the objects collectively form a contour of a circle and any object is not disposed at a central portion of the circle, the central portion of the circle can be deemed as the "position of the object" for the respective objects or an aggregation of the plurality of the objects.

It is preferable to execute a display process in which the object is moved in a direction of a line spanning from the first position to the second position.

According to this embodiment, a moving direction of the object can be changed corresponding to a relationship of the first position and the second position, enabling visual amusement of a game to be enhanced.

If the first position is, for example, a reference point and the second position is, for example, a position of an object, the object may be moved so that the object leaves from the reference point and moves in a direction of the line (1) and the object may be moved so that object approaches the reference point and moves in the direction of the line (2).

It is preferable to execute a step (S3 in FIG. 10) at which the second input variable is changed as time passes.

For example, in a game in which it is required to adjust the control amount to a predetermined target value, a sound strength or the like inputted by an operator via a microphone also has to be changed as time passes. Therefore, according to this embodiment, amusement of a game can be enhanced.

When the control amount is a moving velocity or a moving distance of a first object, it is preferable to determine whether or not the first object has collided with a second object (1) (S207). Further, as a result of the above-mentioned determination (1), if it is determined that the first object has collided with the second object (2), it is preferable to determine whether or not the second object moves to a predetermined position (S211).

The computer further comprises pressing-type input means (including 20d, 20a, 22, etc.) and further is preferably caused to execute a number-of-time storage step (S401) for storing in the memory the number of times at which the pressing-type input means is pressed in a unit of time, as the second input variable.

Preferably, the computer is further caused to execute a sound input determination step (S13) for determining whether or not a sound is inputted via the microphone, and at the number-of-time storage step, it is preferable to store, as the second input variable, the number of times at which the pressing-type input means is pressed in the unit of time including a time at which it is determined at the sound input determination step that a sound is inputted.

As a "game apparatus", a dedicated apparatus, among others, a general-purpose apparatus such as a personal computer, or an information processing apparatus such as a mobile communication terminal including a mobile phone or the like may be caused to execute a game software process.

A game program for executing a display process of objects (C) in a game space displayed on display devices (12, 14) causes a computer (10, 42) to execute an object display step (S7) for displaying the objects through input operations via input means (20, 22); a sound property data storage step (S31, S61) for storing in the memory (48) sound property data inputted via a microphone (34); and an object erasure step (S19) for executing a display process to erase the objects displayed at the object display step by referring to the sound property data stored at the sound property data storage step.

According to this embodiment, when an operator wants to erase the objects inputted via the input means, a simple action of an input to the microphone can erase the objects. Therefore, according to this embodiment, amusement of a game can be enhanced.

It is preferable to display a plurality of objects, according to a plurality of inputs, by using the input means at the object display step and to collectively erase the plurality of objects at the object erasure step.

According to this embodiment, the plurality of objects can be collectively erased through the input operation via the microphone, resulting in a much simpler operation.

It is preferable to cause the computer to execute a sound strength determination step (S13) for determining whether or not the sound strength is more than or equal to a predetermined value by referring to the sound property data, and to execute at the object erasure step, the display process for erasing the objects displayed at the object display step if at the sound strength determination step, the sound strength is determined as being more than or equal to the predetermined value.

While the invention has been described in detail, the foregoing description is in all aspects illustrative and not restrictive. It is understood that numerous other modifications and variations can be devised without departing from the scope of the invention.

What is claimed is:

1. A non-transitory storage medium having stored thereon a game program for calculating a control amount of an object existing at a position in a region of game space displayed on at least one display device, wherein the control amount is a moving velocity or a moving distance of the object and the game program causes a computer to execute:

a first storing step which stores the position in game space of the object;

a first input variable storage step which stores in a memory sound property data inputted via a microphone, as a first input variable;

a reference point determination step which determines a position of a reference point in game space corresponding to a predetermined position in real space relative to the at least one display device, wherein the reference point determination step includes adjusting the reference point in game space as the region of game space which is displayed changes to maintain correspondence between the reference point and the predetermined position in real space;

a second storing step which stores in a memory of the computer the position of the reference point in game space;

a distance calculation step which calculates a distance between the position of the reference point and the position of the object in game space, wherein the distance calculation step is performed after the first and second storing steps;

a second input variable storage step which stores in memory the distance from the distance calculation step as a second input variable, and a control amount calculation step which calculates, as an output variable, the control amount of the object by substituting into a relational expression the first input variable and the second input variable which are stored in the memory.

2. The non-transitory storage medium having stored thereon the game program according to claim 1, wherein at the control amount calculation step, a moving distance of the object is determined based on the first input variable and a moving direction of the object is determined based on the second input variable.

3. The non-transitory storage medium having stored thereon the game program according to claim 1, wherein at the control amount calculation step, the control amount is calculated so that the control amount increases according to an increase of the first input variable or decreases according to a decrease of the first input variable and the control amount increases according an increase of the second input variable or decreases according to a decrease of the second input variable.

4. The non-transitory storage medium having stored thereon the game program according to claim 1, wherein the position of the reference point and the position of the object are coordinates in a coordinate system for the virtual space.

5. The non-transitory storage medium having stored thereon the game program according to claim 4, wherein at least one of the position of the reference point and the position of the object is specified through a user operation.

6. The non-transitory storage medium having stored thereon the game program according to claim 5, wherein the game program causes the computer to execute:

a direction calculation step which calculates a direction of a line spanning between the position of the reference point and the position of the object;

a direction storage step which stores in the memory the direction of the line, which is calculated at the direction calculation step; and a display processing step which conducts a display process to move the object in the direction of the line by referring to the direction of the line, which is stored in the memory.

7. The non-transitory storage medium having stored thereon the game program according to claim 1, wherein the game program causes the computer to execute a step to change a value of the second input variable as time passes.

8. The non-transitory storage medium having stored thereon the game program according to claim 1, wherein the game program causes the computer to execute:

a control amount storage step which stores in the memory the control amount calculated at the calculation step; and a game processing step which performs a game process by using the control amount stored in the memory.

9. The non-transitory storage medium having stored thereon the game program according to claim 8, wherein the game processing step includes a condition determination step to determine whether or not the control amount calculated at the calculation step or the object controlled based on the control amount satisfies predetermined conditions.

10. The non-transitory storage medium having stored thereon the game program according to claim 1, wherein the game program causes the computer to execute a breathing-on determination step to determine whether or not an input via a microphone is a breathing-on sound, and the distance calculation step is executed in response to a determination that the input via the microphone is the breathing-on sound.

11. The non-transitory storage medium having stored thereon the game program according to claim 10, wherein the game program causes the computer to execute the breathing-on sound determination step to determine whether or not the input via the microphone is the breathing-on sound and when at the breathing-on determination step the input via the microphone is determined as the breathing-on sound, execute the distance calculation step by substituting, into the relational expression, latest values of the first input variable and the second input variable, which are stored in the memory at a time of a determination.

12. A non-transitory storage medium having stored thereon a program for conducting a display process for displaying an object existing in a virtual space on at least one display device, wherein the program causes a computer to execute:

a sound property data storage step which stores, in the memory, sound property data inputted via a microphone;

a second position determination step which determines a position of a second position in the virtual space corresponding to a reference position in real space relative to the at least one display device, wherein the second position determination step adjusts the second position to maintain correspondence with the reference position as the region of virtual space displayed on the at least one display device changes;

a position storage step which stores, in the memory, a first position in the virtual space which is specified through a user operation, and the second position in the virtual space;

a direction calculation step which calculates a direction of a line spanning from the first position to the second position by using the first position and the second position stored in the memory;

a direction storage step which stores, in the memory, the direction of the line calculated at the direction calculation step; and a display processing step which conducts a display process to move the object at a moving velocity or a moving distance corresponding a magnitude of a sound and in the direction of the line, by using the direction of the line and the sound property data, which are stored in the memory.

13. The non-transitory storage medium having stored thereon the game program according to claim 12, wherein the game program causes the computer to execute a distance storage step which stores, in the memory, a distance between the first position and the second position, which is stored in the memory, and at the display processing step, the moving velocity or the moving distance are functions of the magnitude of the sound and a length of the distance.

14. A non-transitory storage medium having stored thereon a game program for calculating a moving velocity and a moving distance of an object in a virtual space displayed on at least one display device, wherein the game program causes a computer to execute:
  a determination step which determines whether or not an input via a microphone is a breathing-on sound;
  a first input variable storage which stores, in a memory, sound property data obtained via microphone input information inputted via the microphone, as a first input variable;
  a position storage step which stores, in the memory, a first position in the virtual space which is specified through a user operation, and a second position in the virtual space which corresponds to a certain position in real space relative to the at least one display device, wherein the position storage step adjusts the second position to maintain correspondence between the second position and the certain position in real space as the region of virtual space which is displayed changes;
  a distance calculation step which calculates a distance between the first position and the second position which are stored in the memory;
  a second input variable storage step which stores, as a second input variable, the distance in the memory; and
  a calculation step which calculates, as an output variable, the moving velocity or the moving distance of the object in response to a determination, at the determination step, that the input via the microphone is the breathing-on sound, by substituting, into a relational expression, the first input variable and the second variable which are stored in the memory.

15. A non-transitory storage medium storing a game program for calculating a control amount to be applied to a virtual object at a first position in a virtual space and displayed on a display device and the game program causes a computer,
  obtain a sound input from a microphone and store the sound input as sound property data;
  determine a position for a reference point in the virtual space corresponding to a fixed point in real space relative to the display device, and store the position for the reference point, wherein the determination of a position for the reference point includes adjusting the position to cause the reference point to continue corresponding with the fixed point as the region of virtual space which is displayed changes;
  calculate a distance between the reference point and the first position or a direction from the first position to the reference point, wherein the distance or direction is calculated after the first position and reference point are stored;
  calculate a control amount by substituting into a relational expression the sound property data and the calculated distance or direction;
  control the virtual object based on the calculated control amount, and
  displaying the virtual object being controlled in accordance with the calculated control amount.

16. The non-transitory storage medium according to claim 15, wherein the calculation of the control amount includes calculating a movement of the virtual object and the control of the virtual objection includes moving the object based on the calculated control amount.

17. The non-transitory storage medium according to claim 15, wherein the calculation of the control amount includes calculating the distance based on the sound property data and calculating the direction based on the first position and the reference point.

18. The non-transitory storage medium according to claim 15, wherein the calculated distance is proportional to the sound property data.

19. The non-transitory storage medium according to claim 15, wherein the reference point and the first position of the virtual object are each positions in a predetermined coordinate system for the virtual space.

20. The non-transitory storage medium according to claim 19, wherein at least one of the first position and the reference point is specified by a user input operation.

21. The non-transitory storage medium according to claim 16, wherein the calculated direction is a direction of a line including the reference point and the first position, and the calculated movement includes moving the object in the calculated direction.

22. The non-transitory storage medium according to claim 15, wherein the game program causes the computer to determine whether the calculated control amount satisfies a predetermined condition and the displaying of the virtual object being controlled does not occur if the calculated movement does not satisfy the predetermined condition.

23. The non-transitory storage medium according to claim 15, wherein obtaining the sound input includes determining whether sound received by the microphone is a breathing-on sound and the sound property data represents the breathing-on sound.

24. The non-transitory storage medium according to claim 23, wherein the calculated control amount includes a distance proportional to a value of the sound property data and the direction is along a line including the reference point and the first position.

* * * * *